United States Patent [19]

Tsushima et al.

[11] Patent Number: 5,408,349
[45] Date of Patent: Apr. 18, 1995

[54] OPTICAL FREQUENCY DIVISION MULTIPLEXING TRANSMISSION SYSTEM

[75] Inventors: Hideaki Tsushima, Wako; Shinya Sasaki, Kodaira; Katsuhiko Kuboki, Kokubunji, all of Japan

[73] Assignee: Hitachi, Ltd., Tokyo, Japan

[21] Appl. No.: 907,502

[22] Filed: Jul. 1, 1992

[30] Foreign Application Priority Data

Jul. 5, 1991 [JP] Japan .................................. 3-165360
Dec. 9, 1991 [JP] Japan .................................. 3-324353

[51] Int. Cl.⁶ ...................... H04J 14/02; H04B 10/04; H04B 10/06
[52] U.S. Cl. .................................. 359/124; 369/187; 369/192; 369/194
[58] Field of Search .............................. 359/124–125, 359/133–134, 187–188, 191–192, 194–195

[56] References Cited

U.S. PATENT DOCUMENTS

| 4,710,914 | 12/1987 | Rabieux | 359/125 |
| 4,841,519 | 6/1989 | Nishio | 359/133 |
| 4,989,201 | 1/1991 | Glance | 359/133 |

FOREIGN PATENT DOCUMENTS

0298598 1/1989 European Pat. Off.

OTHER PUBLICATIONS

IEE Global Telecommunications, Conference and Exhibition, Nov. 1988, Hollywood, Fla., US, pp. 473–477, Gambini et al.: *Laser frequency stabilisation for high bit-rate FSK multichannel coherent systems.*
IEEE Network: The Magazine of Computer Communications, vol. 3, No. 2, Mar. 1989, New York, US, pp. 13–20, Linke: *Frequency division multiplexed optical networks using heterodyne detection.*
IEEE Photonics Technology Letters, vo. 2, No. 12, pp. 914–916.
IEEE Photonics Technology Letters, vol 1, No. 6, pp. 140–141.
Electronics Letters, vol. 23, No. 14, pp. 750–752.
IEEE, Journal of Lightwave Technology, vol. LT-5, pp. 274–276.

*Primary Examiner*—Leslie Pascal
*Attorney, Agent, or Firm*—Kenyon & Kenyon

[57] ABSTRACT

An optical frequency division multiplexing transmission system for sending a large volume of information by a single optical fiber is disclosed. Each of an optical frequency division multiplexing transmitter equipment and an optical frequency division multiplexing receiver equipment has an optical filter having a periodic optical transmission characteristic therein. Each optical filter is stabilized with an absolutely-stabilized standard optical frequency. Each optical signal frequency is stabilized to a periodic transmission characteristic of the optical filter arranged in the optical frequency division multiplexing transmitter equipment, and each local frequency to a periodic transmission characteristic of the optical filter arranged in the optical frequency division multiplexing receiver equipment. Even in the case where no optical signal is applied to the optical frequency division multiplexing receiver equipment due to such causes as a fault of the transmission optical source or the breakage of an optical fiber, the local optical source frequency continues to be controlled in stable fashion.

61 Claims, 21 Drawing Sheets

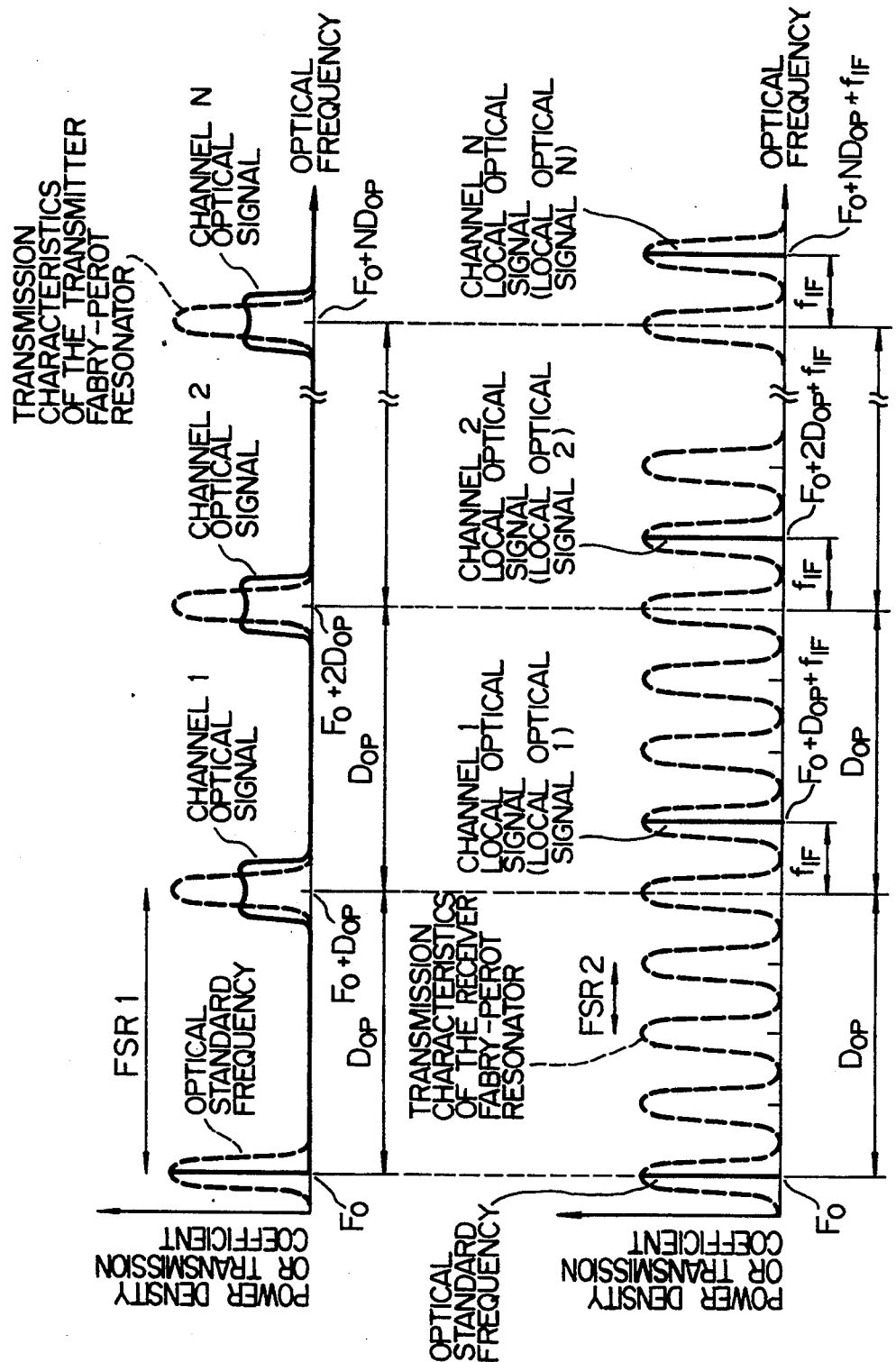

F I G. 13
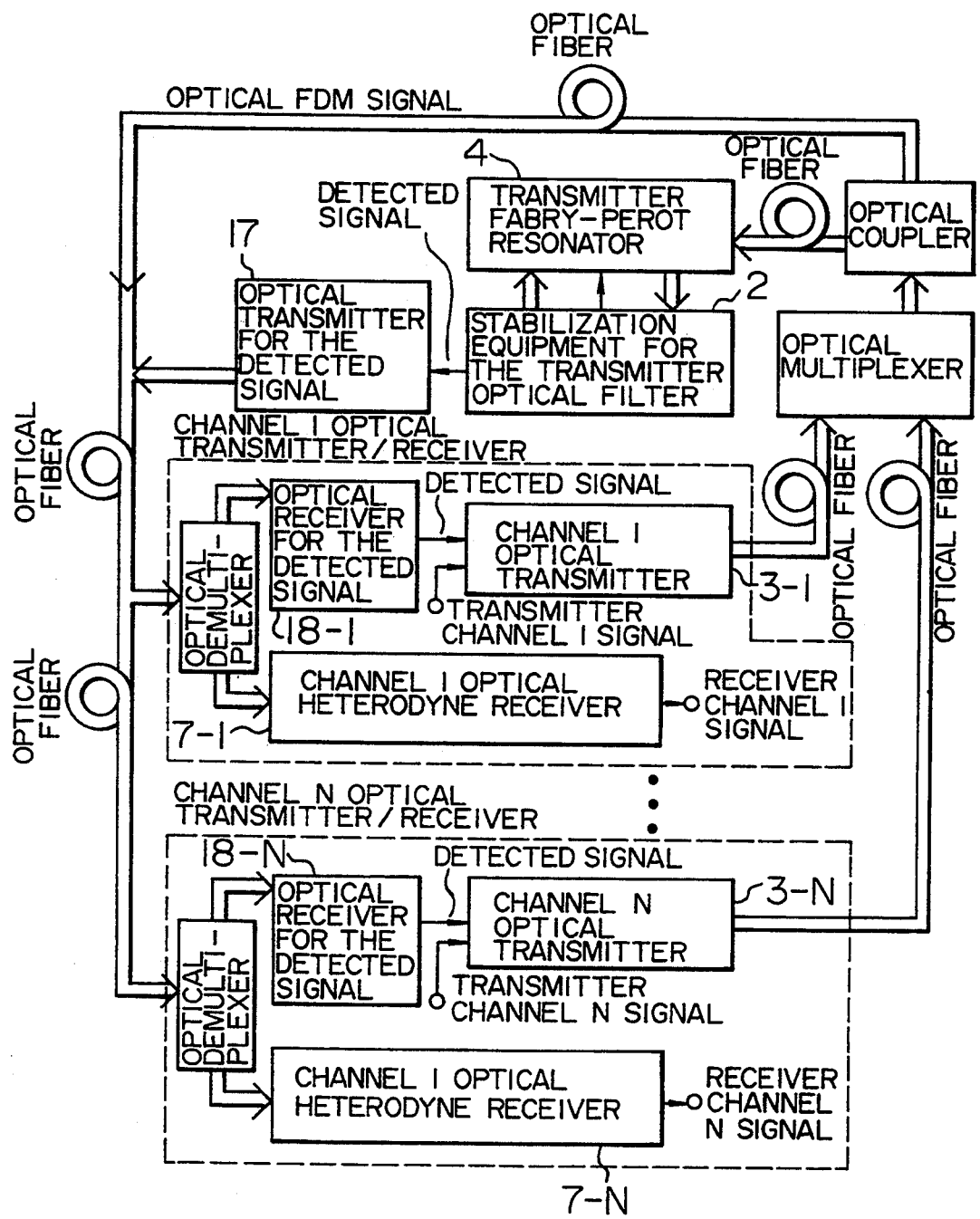

OPTICAL TRANSMITTER / RECEIVER

OPTICAL FREQUENCY REGULATOR

OPTICAL TRANSMITTER/RECEIVER

OPTICAL FREQUENCY REGULATOR

OPTICAL TRANSMITTER / RECEIVER

OPTICAL FREQUENCY REGULATOR

OPTICAL TRANSMITTER / RECEIVER

OPTICAL FREQUENCY REGULATOR

OPTICAL FREQUENCY DIVISION MULTIPLEXING TRANSMISSION SYSTEM

BACKGROUND OF THE INVENTION

The present invention relates to an optical transmission system utilizing the optical frequency division multiplexing technology for sending a large volume of information by means of a single optical fiber.

An optical frequency division multiplexing transmission system (the frequency division multiplexing is hereinafter referred to as "FDM") normally comprises an optical FDM transmitter equipment including a plurality of transmission optical sources (in the number of N, where N is a natural number of 1 or more), an optical fiber for transmitting an optical FDM signal and an optical FDM receiver including a plurality (a number N) of heterodyne optical receivers. The frequency interval of a transmission optical source is normally stabilized at a predetermined value of Dop. Each heterodyne optical receiver (the n-th one, for example, where n is a natural number satisfying the relation $1 \leq n \leq N$) receives only an optical signal outputted from a corresponding (n-th) optical source on transmitter side. A conventional optical FDM transmission system is described, for example in IEEE Photonics Technology Letters, Vol. 2, No. 12, pp. 914–916. In the conventional optical FDM transmission system, the frequency of a local optical source (hereinafter referred to as "the local frequency") is controlled in such a manner as to follow the variations in the central frequency of a received optical signal (hereinafter referred to as "the optical signal frequency"), thereby stabilizing the difference frequency (hereinafter referred as "the intermediate frequency") at a predetermined value $f_{IF}$.

SUMMARY OF THE INVENTION

Conventional systems in which the local frequency is controlled in such a manner as to maintain a predetermined intermediate frequency pose the problem that a failure to apply an optical signal to an optical FDM receiver due to the fault of a transmission optical source or breakage of an optical fiber makes it impossible to control the local frequency.

This problem is solved by arranging an optical filter having a periodic optical transmission characteristic at each of an optical FDM transmitter and a receiver, stabilizing each optical filter at an absolutely-stabilized optical standard frequency, and by stabilizing each local frequency at the periodic transmission characteristic of an optical filter arranged at the optical FDM receiver.

The object of the present invention is to solve the above-mentioned problem, that is, to provide an optical FDM transmission system capable of controlling the local frequency of an optical FDM receiver even when no optical signal is inputted to the optical FDM receiver due to the fault of a transmission optical source or the breakdown of an optical fiber.

Take a Fabry-Perot resonator (hereinafter referred to as "the FP resonator"), for example, as a representative optical filter. The optical transmission characteristic of an FP resonator includes the period determined by the refraction index $n_0$ specific to the resonator material and the length L of the resonator (normally called the FSR as an abbreviation of Free Spectral Range). The value of FSR is known to be given as $c/2Ln_0$ (c: The velocity of light in vacuum). It is, therefore, possible to design the FSR of an FP resonator freely by determining L and $n_0$).

According to the present invention, an FP resonator (a transmission FP resonator and a receiving FP resonator) is arranged for an optical FDM transmitter and an optical FDM receiver, respectively. Especially, the system according to the present invention can be realized with a simple configuration by satisfying the following equations as the FSR (FSR1 and FSR2) of the transmission FP resonator.

$$FSR1 = (1/m_1) \, Dop \; (m_1: \text{natural number}) \quad (1)$$

$$FSR2 = (1/m_2) \, Dop \; (m_2: \text{natural number}) \quad (2)$$

$$FSR3 = (1/k) \, f_{IF} \; (k: \text{natural number}) \quad (3)$$

An example of the FP resonator meeting these three equations is shown in FIGS. 3A and 3B. The abscissa represents an optical frequency, and the ordinate the electric power density of the light and the transmission coefficient of the FP resonator. The dashed line represents the transmission characteristics of respective FP resonators. FIG. 3A shows a case where FSR1=Dop ($m_1=1$), and FIG. 3B a case where FSR2=($\frac{1}{4}$)·Dop=$f_{IF}$ ($m_2=4$, $k=1$).

Further, according to the present invention, the transmission characteristics of these two FP resonators are stabilized independently at an absolutely-stabilized optical standard frequency $F_0$. FIGS. 3A and 3B show a case in which the two FP resonators are stabilized in such a manner that the transmission coefficient reaches the peak at the optical standard frequency $F_0$. Next, the optical FDM transmitter stabilizes the optical signal frequencies of channels 1, 2, ..., N to an optical frequency associated with a peak transmission coefficient of the transmission FP resonator. As a result, the optical signal frequencies of channels 1, 2, ..., N become $F_0+Dop$, $F_0+2Dop$, ..., $F_0+NDop$ respectively, thereby stabilizing the intervals of the optical signal frequencies to Dop. The optical FDM receiver, on the other hand, stabilizes the local lights 1, 2, ..., N used for heterodyne detection of the optical signals of channels 1, 2, ..., N, to the optical frequencies $F_0+Dop+f_{IF}$, $F_0+2Dop+f_{IF}$, ..., $F_0+NDop+f_{IF}$ respectively associated with a peak transmission characteristic of the receiving FP resonator at intervals of Dop. As a result, the frequency difference of a local frequency corresponding to a given optical signal frequency becomes $f_{IF}$ for any channel. When an optical signal of channel n is received by a heterodyne detector having a local optical source (n), therefore, the intermediate frequency of the resulting signal is always $f_{IF}$. Since the optical signal frequency and the local frequency are stabilized independently, the local frequency continues to be controlled in stable manner even though the optical signal may not be inputted to the heterodyne detector.

As described above, according to the present invention, the optical signal frequency and the local frequency are independently stabilized by an optical FDM transmitter equipment and an optical FDM receiver equipment, respectively, so that the advantage results that the local frequency continues to be stably controlled even when the optical FDM receiver equipment fails to be inputted with an optical signal due to the fault of the transmission optical source or the breakdown of an optical fiber.

BRIEF DESCRIPTION OF THE DRAWINGS

FIGS. 3A and 3B show an arrangement of the optical signal, the optical frequency of local optical signal and the transmission characteristics of a Fabry-Perot resonator.

FIG. 13 is a diagram showing an embodiment of an optical FDM transmitter/receiver.

DESCRIPTION OF THE PREFERRED EMBODIMENTS

1. First Embodiment

Figure 1:
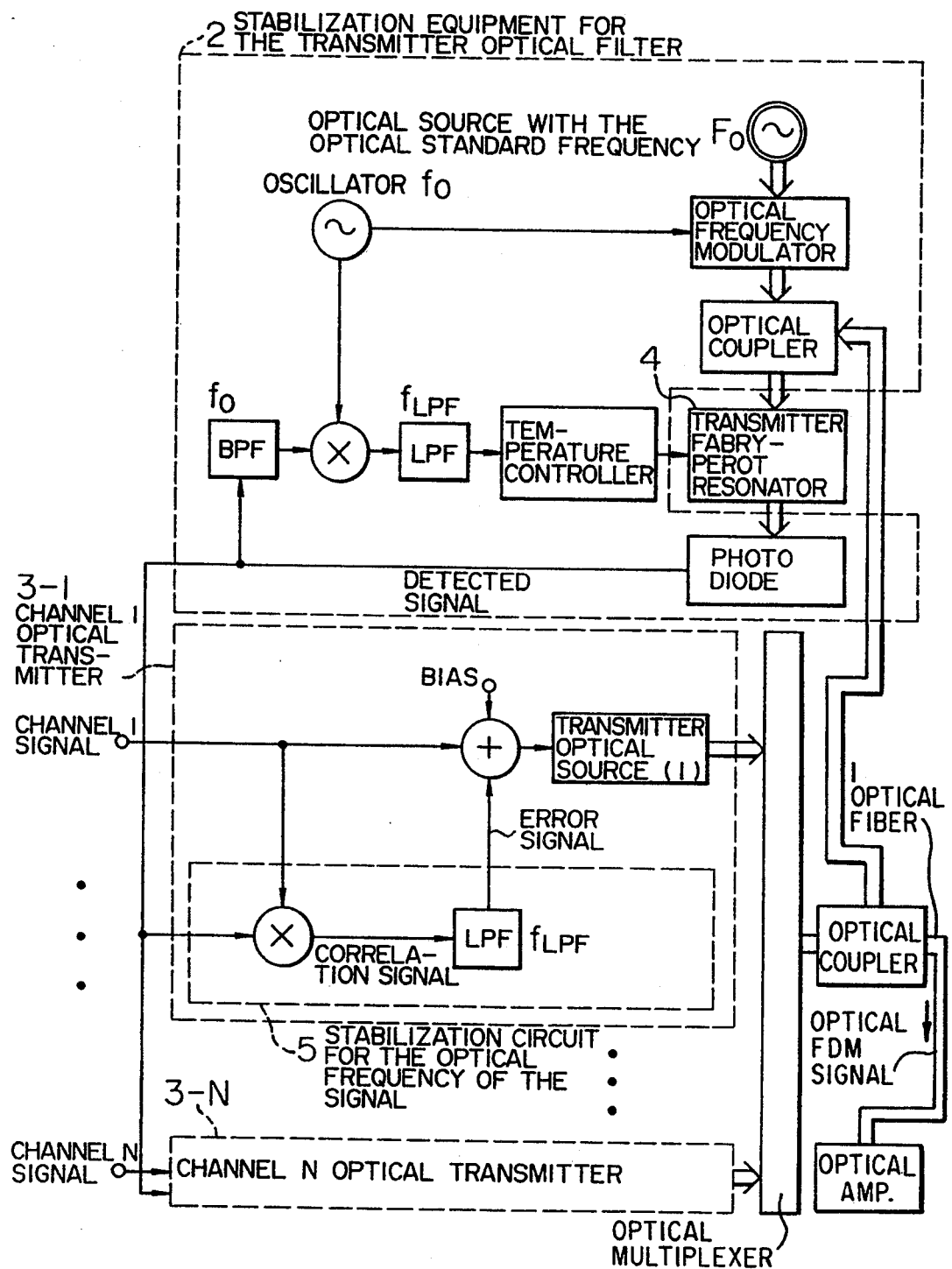
FIG. 1 is a diagram showing the configuration of a first embodiment of an optical FDM transmitter equipment.
Figure 2:
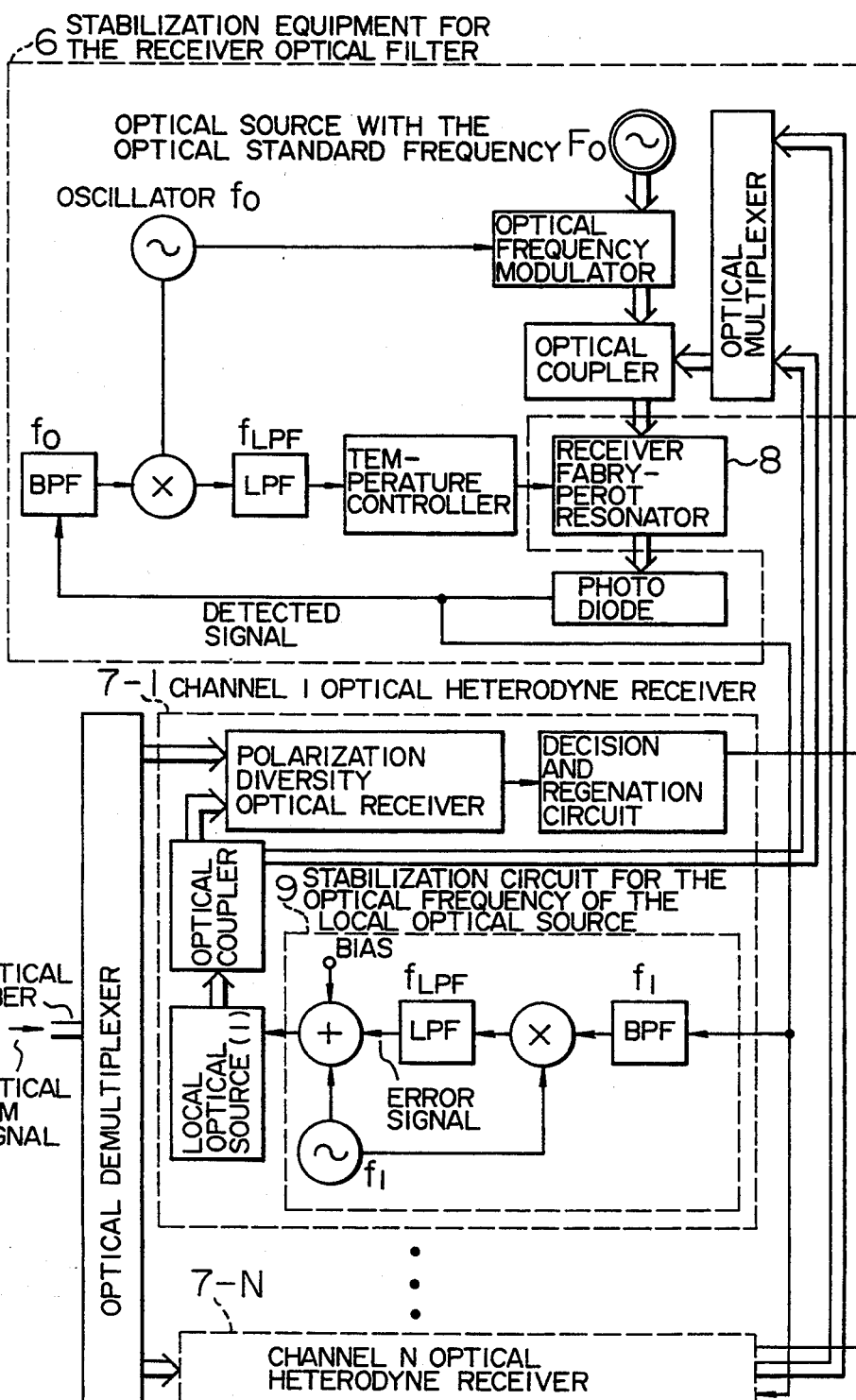
FIG. 2 is a diagram showing the configuration of a first embodiment of an optical FDM receiver equipment.

A first embodiment of the present invention is shown in FIGS. 1 and 2. An optical FDM transmitter system comprises an optical FDM transmitter equipment (FIG. 1) inputted with a number N of information signals (channel 1 to N signals) for outputting an optical FDM signal, an optical fiber (designated by 1 in FIG. 1) for transmitting an optical FDM signal and an optical FDM receiver equipment (FIG. 2) inputted with an optical FDM signal for outputting signals of channels 1 to N. An optical amplifier may be connected to the optical fiber as shown in FIG. 1. A modulation system considered for use with each optical signal includes a frequency shift keying, amplitude shift keying and a phase shift keying.

1.1 Optical FDM transmitter equipment

An optical FDM transmitter equipment comprises an optical transmission filter stabilizer 2, a number N of optical transmitters 3-1 to 3-N (optical transmitters for channels 1 to N), an optical multiplexer for multiplexing optical signals outputted from the N optical transmitters and outputting an optical FDM signal, and an optical coupler for dividing an optical FDM signal into two parts.

(1) Stabilizer for transmission optical filter

First, the configuration of this device will be described. The component parts of the transmission optical filter stabilization equipment 2 include a standard optical source for an optical frequency signal for outputting an absolutely-stabilized optical standard frequency $F_0$, an optical frequency modulator for subjecting the light outputted from an optical source to frequency modulation at a frequency of $f_0$, an optical coupler for multiplexing a frequency-modulated light with an optical FDM signal and outputting it to a transmission Fabry-Perot resonator (with a transmission characteristic shown by the dashed line in FIG. 3A), a photodiode for converting the light outputted from the transmission Fabry-Perot resonator into an electrical signal and producing a detected signal, a bandpass filter (designated by BPF in the diagram with a central frequency $f_0$) for extracting a signal component of the frequency $f_0$ from the detected signal, a multiplier for multiplying the extracted signal with a signal (frequency $f_0$) from an oscillator, a low-pass filter (designated by LPF in the diagram with a cut-off frequency of $f_{LPF} \ll f_0$) for extracting an error signal from a multiplied signal, a temperature control circuit for controlling the temperature of a transmission Fabry-Perot resonator by the error signal. An optical frequency standard source may be realized, for example, by a configuration described in IEEE Photonics Technology Letters, Vol 1, No. 6, pp. 140–141). An optical frequency modulator, on the other hand, is realizable by using lithium niobate or the like having a photo-electric effect. Also, a transmission FP resonator is realized by using, for example, such a material as synthesized quartz or BK-7. These materials have an expansion coefficient not zero against temperature changes, and therefore are capable of controlling the length of a resonator by changing the temperature thereof.

Figure 4A:
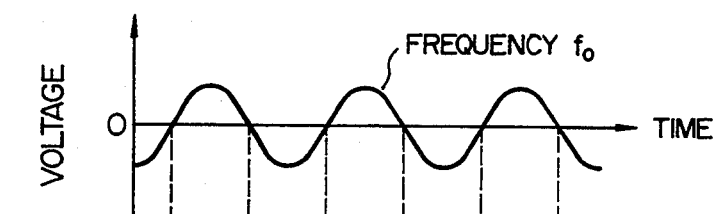
FIGS. 4A to 4E are a diagram showing signal waveforms produced at various parts in a transmission optical fiber stabilization equipment.
Figure 4B:
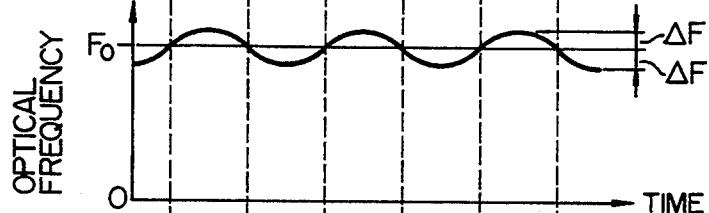
Figure 4C:
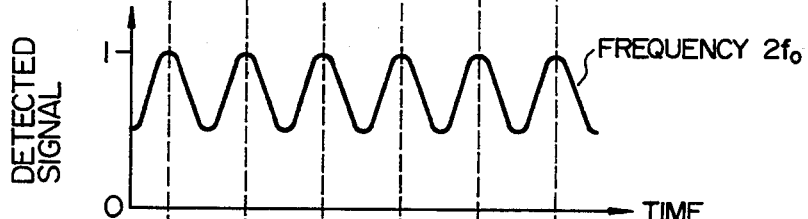
Figure 4D:
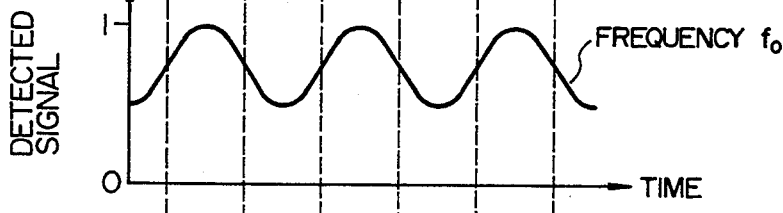
Figure 4E:
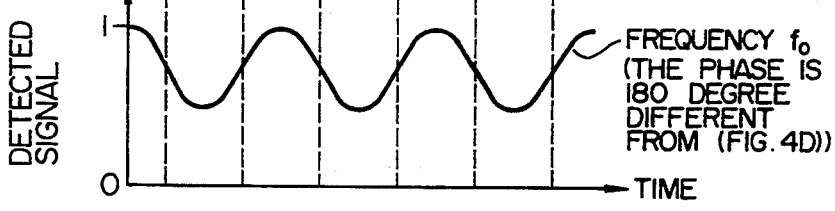

Now, the operating principle will be explained. FIG. 4 shows signal waveforms produced at various parts in the case where the transmission FP resonator is stabilized by use of the light of frequency $F_0$ outputted from a standard optical source. FIG. 4A shows a voltage signal of frequency $f_0$ applied to an optical frequency modulator. As a result of application of this voltage, an optical signal (central frequency $F_0$, frequency shift $\pm \Delta F$, $\Delta F \ll Dop/2$) subjected to frequency modulation is produced as an output of the optical frequency modulator (FIG. 4B). When this optical signal is applied to a transmission FP resonator having a transmission characteristic as shown in FIG. 3A and the output thereof is detected by a photo-diode, a signal as shown in FIG. 4C is produced as a detected signal. This waveform is obtained because the transmission FP resonator has a peak transmission coefficient at the frequency $F_0$ and the optical power outputted from the transmission FP resonator becomes maximum each time the optical frequency of the frequency modulated signal coincides with $F_0$. In the process, the frequency of variations in the detected signal becomes $2f_0$, and therefore this detected signal is removed by a bandpass filter. As a result, the error signal produced from a low-pass filter is zero, so that the temperature control circuit maintains the temperature of the transmission FP resonator at a constant value. More specifically, the frequency associated with a peak transmission coefficient of the transmission FP resonator continues to be stabilized at $F_0$. When the transmission characteristic of the transmission FP resonator undergoes such a change as to have a peak transmission coefficient at a frequency $F_0 + \Delta F$, however, the detected signal assumes a waveform as shown in FIG. 4D. This detected signal has a frequency of $f_0$ and passes through a bandpass filter. Multiplication of a signal (frequency $f_0$) from an oscillator produces a positive signal with a frequency of almost zero (almost direct current). When this signal is applied to a low-pass filter, a positive error signal is outputted. This error signal causes the temperature control circuit to operate in such a manner as to restore the frequency associated with a peak transmission coefficient of the transmission FP resonator from $F_0 + \Delta F$ to $F_0$. In the case where the transmission coefficient of the transmission FP resonator undergoes such a change as to have a peak transmission coefficient at a frequency $F_0 - \Delta F$, on the other hand, the detected signal assumes a waveform (with frequency $f_0$ but displaced by 180 degree as compared with the waveform in FIG. 4D) as shown in FIG. 4E, thereby producing a negative error signal. As a result, the temperature control circuit operates in the direction opposite to FIG. 4D, and the frequency associated with a peak transmission coefficient of the transmission FP resonator is restored from $F_0 - \Delta F$ to $F_0$. In this way, the transmission characteristic of the transmission FP resonator is controlled to have a peak at a frequency $F_0$ by the transmission Fabry-Perot resonator stabilization equipment shown in FIG. 1. Although an optical FDM signal is inputted to the transmission FP resonator in addition to an optical standard frequency $f_0$, the effect of the optical FDM signal can be removed by a bandpass filter (central frequency $f_0$) if the frequency $f_0$ is sufficiently large as compared with the transmission rate of each optical signal constituting an optical FDM signal. Specifically, a signal similar to the one shown in FIG. 4 is obtained even when an optical FDM signal is inputted to the transmission FP resonator.

(2) Optical transmitter

An example of configuration of a system for stabilizing the frequency of each transmission optical source for the above-mentioned transmission FP resonator is shown as an optical transmitter in FIG. 1. The optical transmitter includes a transmission optical source, an adder and an optical signal frequency stabilizing circuit. The optical transmitter for each channel has a similar configuration. The transmission optical source in a channel-n optical transmitter is called a transmission optical source (n). In this configuration, an optical FDM signal is inputted through the above-mentioned optical coupler to the transmission FP resonator. The correspondence between a frequency associated with a peak transmission coefficient of the transmission FP resonator and each optical signal frequency is shown in FIG. 3A. A detected signal outputted from a photo-diode is distributed among the optical signal frequency stabilizing circuits in respective channel optical transmitters by being divided accordingly. A detected signal contains the information on frequency fluctuations of all transmission optical sources. As a result, in the channel-1 optical transmitter, for example, a channel-1 signal is multiplied by the detected signal to extract only the information on frequency fluctuations (correlation signal) of the channel-1 transmission optical source. The correlation signal applied to a low-pass filter (LPF in FIG. 1, with a cut-off frequency of $f_{LPF} \ll$ transmission rate $f_0$ of each signal) to remove high-frequency components, thus producing an error signal. The error signal is added to a channel-1 signal and a bias signal and is injected into the transmission optical source (1) in such a polarity that the optical frequency of the transmission optical source (1) is stabilized at a frequency $F_0 + Dop$ associated with a peak transmission coefficient of the transmission FP resonator. A similar operation stabilizes the transmission optical sources (2) to (N) of other channels at a peak transmission coefficient of corresponding transmission FP resonators. Specifically, the channel-1, channel-2, . . . , channel-N optical signal frequencies are stabilized at $F_0 + Dop$, $F_0 + 2Dop$, . . . , $F_0 + NDop$, respectively. This stabilization method is described, for example, in Electronics Letters, Vol. 23, No. 14, pp. 750–752.

1.2 Optical FDM receiver equipment

An example of configuration of equipment at receiving end is shown in FIG. 2. An optical FDM receiver equipment includes a receiving optical filter, a receiving optical filter stabilization equipment (designated by numeral 6 in FIG. 2), a number N of heterodyne optical receivers (channel-1 to channel-N heterodyne optical receivers) (designated by numeral 7 in FIG. 2), and an optical demultiplexer for dividing the optical DM signal into a number N of heterodyne optical receivers.

(1) Receiving optical filter stabilization equipment

The operation of a receiving optical filter stabilization equipment is identical to that of a transmission Fabry-Perot resonator stabilization equipment in the optical FDM transmitter equipment. An optical multiplexer is added to the transmission Fabry-Perot resonator stabilization equipment because the local optical signal outputted from each heterodyne optical receiver is multiplexed and applied to the receiving Fabry-Perot resonator. A Mach-Zehnder optical filter or a star coupler may be used as an optical multiplexer.

(2) Heterodyne optical receiver

First, the configuration of this receiver will be explained with reference to a channel-1 heterodyne optical receiver. A channel-1 heterodyne optical receiver includes a local signal optical source for outputting a local optical signal of $F_0+\text{Dop}+f_{IF}$ in optical frequency, an optical coupler for dividing a local optical signal, a polarization diversity optical receiver for receiving an optical signal and producing a base band signal by use of one output of the optical coupler, a decision and regeneration circuit for discriminating and regenerating a channel-1 signal from the signal outputted from the polarization diversity optical receiver, and a local frequency stabilization circuit for producing an error signal from a detected signal obtained in the receiving Fabry-Perot resonator stabilization equipment. The local frequency stabilization circuit, in turn, includes a bandpass filter (BPF with a central frequency $f_1$) for extracting the components of frequency $f_1$ from the detected signal, an oscillator (with frequency $f_1$ identical to the central frequency of the bandpass filter) for outputting a sinusoidal wave signal, a multiplier for multiplying an extracted signal with a sinusoidal signal, a low-pass filter (LPF with a cut-off frequency of $f_{LPF} \ll f_1$) for extracting an error signal from a multiplied signal, and an adder for adding an error signal, a sinusoidal signal and a bias signal to each other. The heterodyne optical receiver for each channel has a similar configuration, although the central frequencies of the oscillator and the bandpass filter are $f_1, f_2, \ldots, f_N$ and are different for different channels $1, 2, \ldots, N$ respectively ($f_1 \neq f_2 \neq \ldots \neq f_N \neq f_0$). Also, the local optical source in a channel-n heterodyne optical receiver is called a local optical source (n). The above-mentioned polarization diversity optical receiver is realized with a configuration described in IEEE, Journal of Lightwave Technology, Vol. LT-5, No. 2, pp. 274-276.

Figure 21:
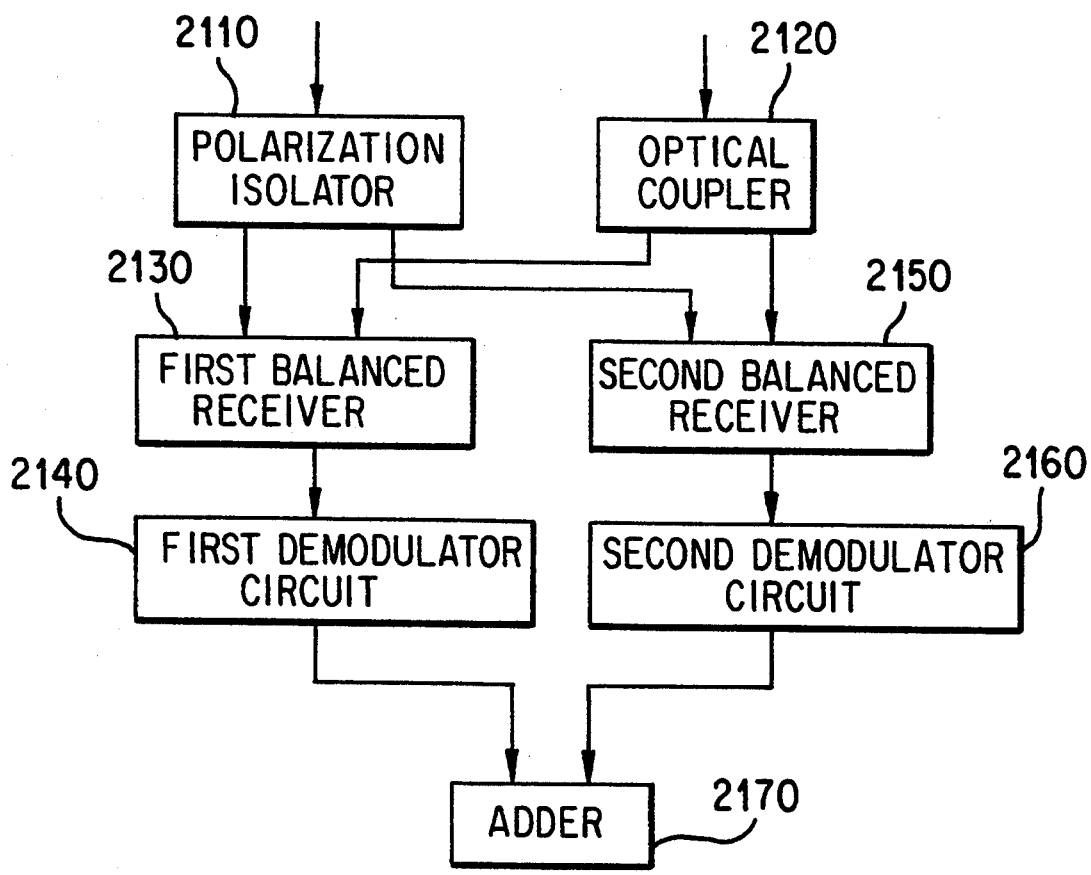
FIG. 21 is a diagram showing a configuration of an embodiment of the polarization diversity optical receiver.

FIG. 21 is a diagram showing a configuration of an embodiment of the polarization diversity optical receiver. A polarization isolator 2110 isolates an optical signal into horizontal and vertical polarization optical signals. On the other hand, an optical coupler 2120 divides a local optical signal into first and second local optical signals. A first balanced receiver 2130 subjects a horizontal polarization optical signal to heterodyne detection by means of the first local optical signal. A first demodulator circuit 2140 converts a first intermediate frequency signal outputted from the first balanced receiver into a first base band signal. A second balanced receiver 2150 subjects a vertical polarization optical signal to heterodyne detection by means of a second local optical signal. A second demodulator circuit 2160 converts a second intermediate frequency signal outputted from the second balanced receiver into a second base band signal. An adder 2170 adds the first and second base band signals and outputs a base band signal.

Figure 5A:
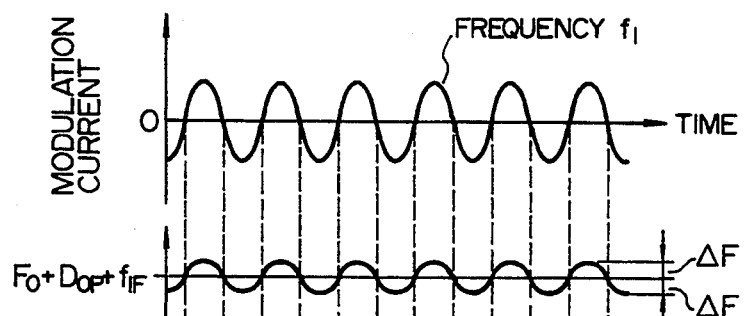
FIGS. 5A to 5E are a diagram showing signal waveforms produced at various parts in a channel-1 heterodyne optical receiver.
Figure 5B:
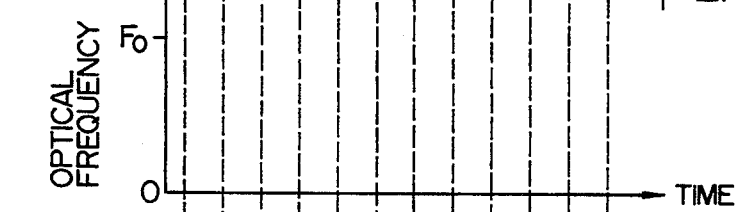
Figure 5C:
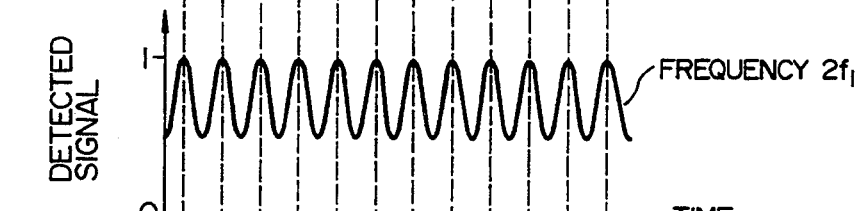
Figure 5D:
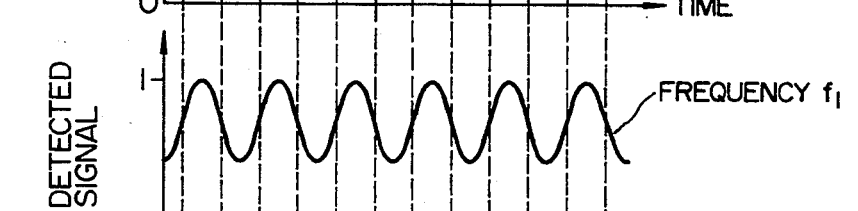
Figure 5E:
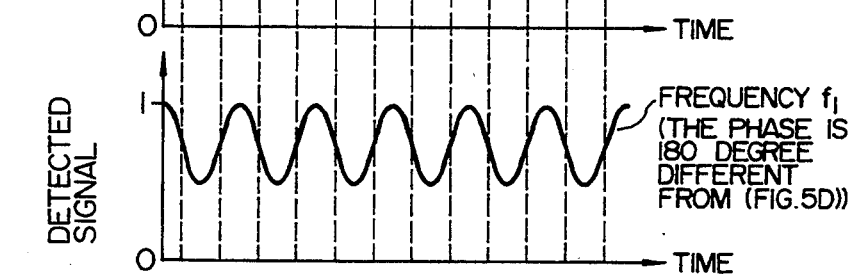

Now, the operating principle of this equipment will be explained. A heterodyne optical receiver is such that a local optical source is subjected to frequency modulation by a minute sinusoidal wave current in order to stabilize the optical frequencies of local optical sources ((1) to (N)) of channels $1, 2, \ldots, N$ to peak transmission coefficient frequencies ($F_0+\text{Dop}+f_{IF}$, $F_0+\text{Dop}+2f_{IF}$, $\ldots$, $F_0+\text{Dop}+Nf_{IF}$) corresponding to the receiving FP resonators, respectively. Modulation frequencies $f_1, f_2, \ldots, f_N$ ($f_1 \neq f_2 \neq \ldots \neq f_N \neq f_0$) are allocated to channels $1, 2, \ldots, N$, respectively. The stabilizing operation will be explained with reference to the channel-1 heterodyne optical receiver. Signal waveforms produced at various parts are shown in FIG. 5. FIG. 5A shows a waveform of a modulation current. As a result of modulation, an optical signal subjected to frequency modulation around a frequency $F_0+\text{Dop}+f_{IF}$ is produced (FIG. 5B). This optical signal is applied to a receiving FP resonator having a transmission characteristic as shown by the dashed line in FIG. 3A, and the output thereof is detected by a photo-diode, thus producing a detected signal as shown in FIG. 5C. This waveform is produced because the receiving FP resonator has a peak transmission coefficient at a frequency $F_0+\text{Dop}+f_{IF}$, and the optical power outputted from the receiving FP resonator becomes maximum each time the optical frequency of the frequency-modulated signal coincides with $F_0+\text{Dop}+f_{IF}$. At the same time, the frequency of detected signal variations becomes $2f_1$. This detected signal is therefore removed by a bandpass filter. As a result, the error signal outputted from the low-pass filter becomes zero and the local optical source (1) is maintained at a constant frequency. When the frequency of the local optical source (1) undergoes a variation and the central frequency thereof becomes $F_0+\text{Dop}+f_{IF}-\Delta F$, however, the detected signal assumes a waveform as shown in FIG. 5D. This detected signal has a frequency $f_1$ and passes through a bandpass filter, and by multiplication with a signal ($f_1$) from an oscillator, generates a positive signal with a frequency of almost zero (direct current). As a consequence, a positive error signal is produced from a low-pass filter. This error signal restores the frequency of the local optical source (1) to $F_0+\text{Dop}+f_{IF}$. When the frequency of the local optical source (1) undergoes a change and the central frequency becomes $F_0+\text{DFop}+f_{IF}+\Delta F$, on the other hand, the detected signal assumes a waveform shown in FIG. 5E thereby to produce a negative error signal. The frequency of the local optical source (1) is thus restored from $F_0+\text{Dop}+f_{IF}+\Delta F$ to $F_0+\text{Dop}+f_{IF}$. Although the receiving FP resonator is supplied with lights from other local optical sources (2) to (N) in addition to the light from the local optical source (1), the fact that these lights are subjected to frequency modulation with different frequencies makes it possible to extract only the information on fluctuations of related local optical source frequencies through a bandpass filter (BPF) of each heterodyne optical receiver. More specifically, even when other lights are inputted to the receiving FP resonator, a signal waveform similar to the one shown in FIG. 5 is capable of being produced. As seen from above, the optical frequencies of the local optical sources of channels $1, 2, \ldots, N$ of a heterodyne optical receiver are stabilized to $F_0+\text{Dop}+f_{IF}$, $F_0+2\text{Dop}+f_{IF}, \ldots, F_0+N\text{Dop}+f_{IF}$, respectively.

1.3 Optical FDM transmission system

As will be understood from the foregoing explanation, according to an optical FDM transmission system having a configuration as shown in FIG. 1, when a channel-n ($1 \leq n \leq N$) optical signal is received by a channel-n heterodyne optical receiver, the intermediate frequency of a resulting signal is always $f_{IF}$. In the process, the optical signal frequency and the local frequency are stabilized independently of each other, and therefore the advantage results that the local frequency continues to be controlled in stable manner even when no optical signal is applied to a heterodyne detector.

2. Second Embodiment

Figure 6:
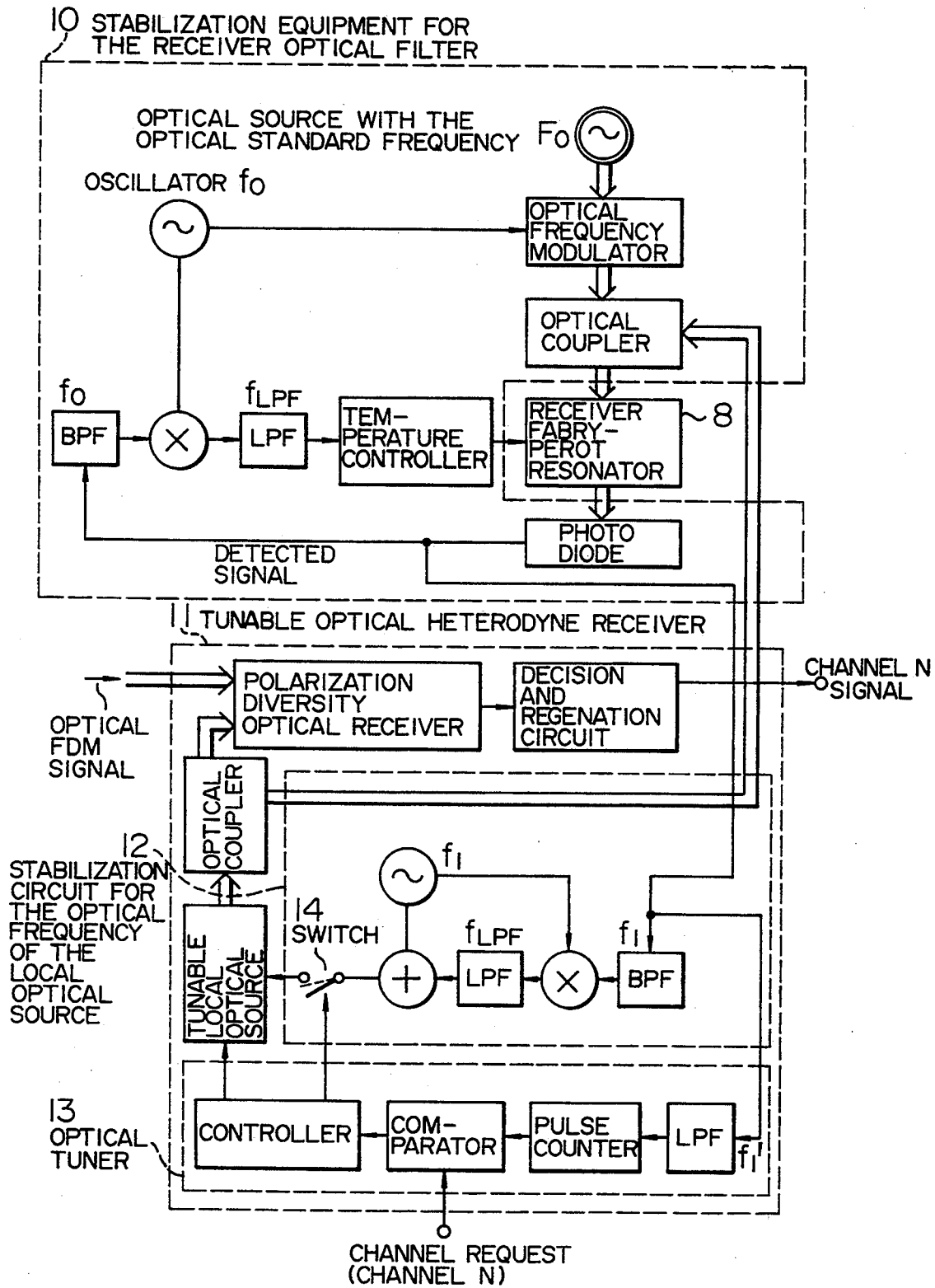
FIG. 6 is a diagram showing a configuration of a second embodiment of an optical FDM receiver equipment.

A configuration of a second embodiment of an optical FDM receiver equipment is shown in FIG. 6. The second embodiment is an improvement of an optical FDM receiver equipment according to the first embodiment for application to an optical FDM transmission system of information distribution type. The optical FDM signal obtained in an optical FDM transmitter equipment (with the same configuration as in FIG. 1) is distributed among tunable optical FDM receiver equipments arranged at different positions through different optical fibers. An optical amplifier may be connected to each of the optical fibers as shown in FIG. 1. The optical FDM receiver equipment is adapted to receive a channel of the desired optical signal from among optical FDM signals sent thereto. The frequency of a local optical source is required to be switched in order to switch the channels of optical signals received. For this purpose, a tunable heterodyne optical receiver is installed at the receiving end.

The optical FDM receiver equipment according to the present embodiment includes a receiving optical filter, a receiving optical filter stabilization equipment and a tunable heterodyne optical receiver (designated by numeral 11 in FIG. 6). The receiving optical filter stabilization equipment is configured as described by numeral 10 in FIG. 6, with an optical coupler removed from the equipment 6 according to the first embodiment. This is because the optical receiving equipment under consideration includes only a single local optical source. The receiving Fabry-Perot resonator is stabilized to an optical standard frequency $F_0$ by the same method as according to the first embodiment.

Figure 7:
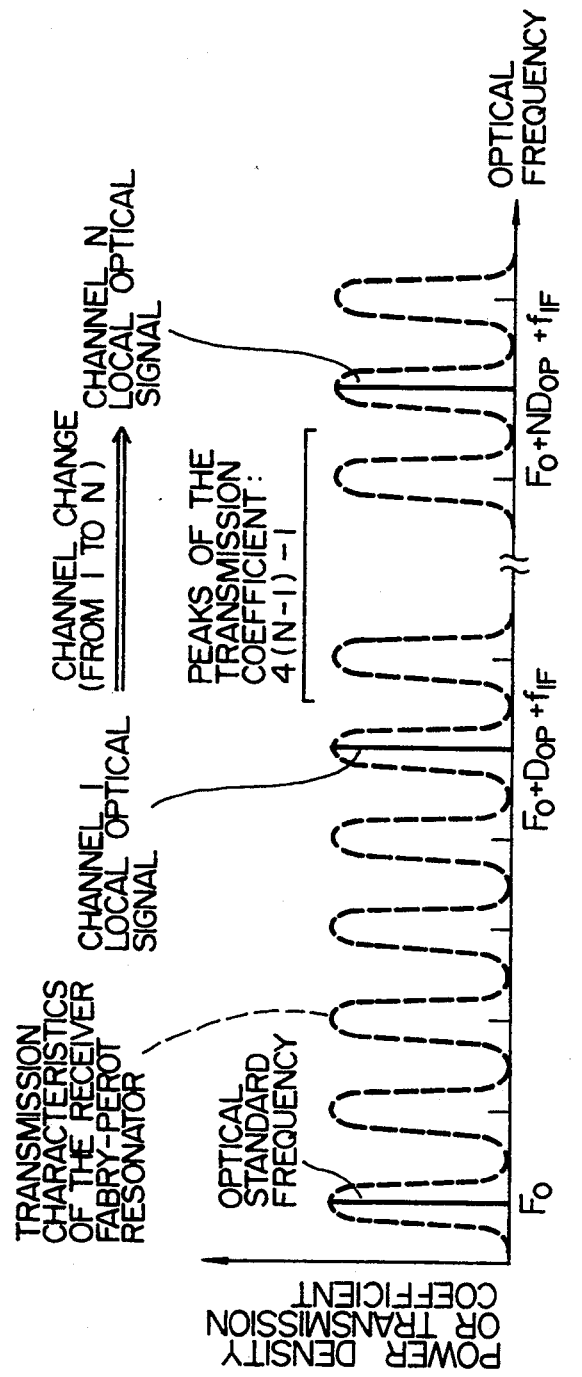
FIG. 7 is an arrangement of the optical frequency of the local optical signal and the transmission characteristic of a Fabry-Perot resonator.
Figures 8A, 8B, 8C:
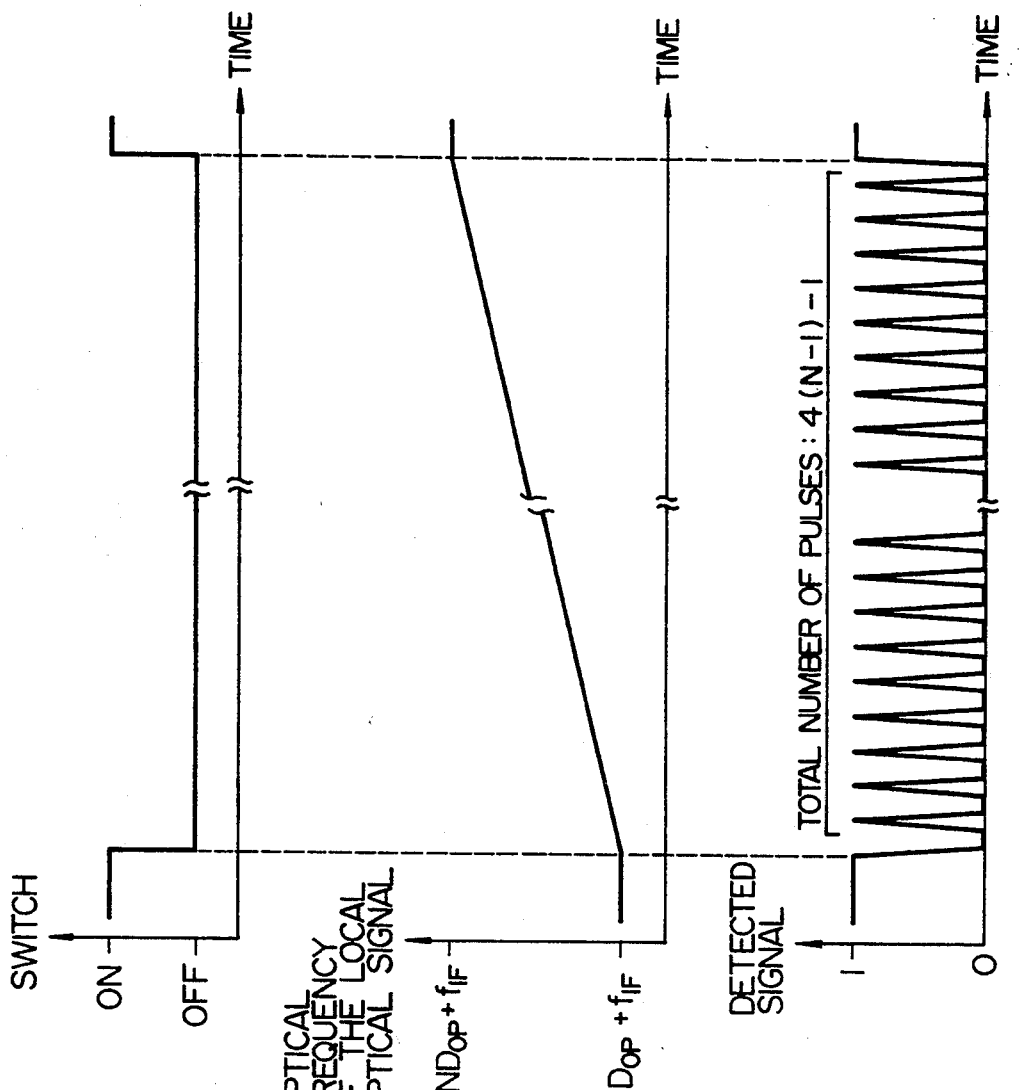
FIGS. 8A to 8C are a diagram showing the correspondence between the optical frequency, the on-off state of a switch and pulse generation.

The present embodiment is different from the first embodiment in that according to the present embodiment, the frequency of the local optical source is switched in accordance with the channel of an optical signal received. Numeral 11 designates a configuration of a tunable heterodyne optical receiver. This configuration constitutes a heterodyne optical receiver 7 shown in FIG. 2 with an optical tuner 13 added thereto. Also, a switch 14 is added to the local frequency stabilization circuit 12. The optical tuner includes a low-pass filter (LPF, with a cut-off frequency of $f_1'$, $f_1' < f_1$), a pulse counter for counting the pulses generated as a detected signal at the time of switching the local frequency, a comparator for comparing the number of counted pulses with the number of pulses that should have been generated at the time of channel switching (which depends on the channel requested), and a controller for turning on and off a switch and controlling the frequency of a tunable local optical source in accordance with the output of the comparator. When the switch is on, the local frequency is stabilized at a frequency with peak transmission coefficient of a receiving FP resonator, but not when the switch is off. The operation of the optical tuner will be described with reference to FIGS. 7 and 8. Take the case where channel 1 is switched to channel N as an example. FIG. 7 shows the transmission characteristic of a receiving FP resonator and an arrangement of local frequencies before and after frequency switching. The transmission characteristic of the receiving FP resonator is identical to that in the first embodiment, and is stabilized in such a manner that the transmission coefficient reaches a peak at an optical standard frequency $F_0$. In FIG. 7, the local frequency is switched from $F_0+Dop+f_{IF}$ to $F_0+NDop+f_{IF}$ in order to switch the receiving signal from channel 1 to channel N. The receiving FP resonator has transmission coefficient peaks in the number of $4(N-1)-1$ between frequencies $F_0+Dop+f_{IF}$ and $F_0+NDop+f_{IF}$ (except for the transmission coefficient peaks at the frequencies of starting and terminating points). As a result, a pulse is generated in the detected signal outputted from the receiving FP resonator each time the local frequency passes a transmission coefficient peak. The correspondence between the pulse generation, switch on/off states and the local frequency is shown in FIG. 8. FIG. 8A is a diagram showing whether the switch is in on or off state. When a channel request signal is applied to an optical tuner with the aim to switching the channel to N while the channel 1 is received, the switch is turned off and the local frequency stabilization to a frequency associated with a peak transmission coefficient is stopped. Then, as shown in FIG. 8B, the local frequency is swept from $F_0+Dop+f_{IF}$ toward $F_0+NDop+f_{IF}$. In the sweeping process, a pulse shown in FIG. 8C is generated in the detected signal. A pulse counter counts the pulses thus generated, and the local frequency stops being swept with the pulse immediately following the time point when the number of pulses reaches $4(N-1)-1$. The switch is then turned on again, and the local frequency is stabilized at a frequency associated with a peak transmission coefficient of the receiving FP resonator at $F_0+NDop+f_{IF}$. Since the channel-N optical signal frequency is $F_0+NDop$, the intermediate frequency of the signal obtained by heterodyne detection is $f_{IF}$, so that the receiving of channel N is immediately started (tuning completed). In a similar principle, in the case where channel 1, 2, ..., (N−1) is to be selected, the optical frequency of a local optical source is stabilized after being switched to $F_0+Dop+f_{IF}$, $F_0+2Dop+f_{IF}$, ..., $F_0+(N-1)Dop+f_{IF}$, respectively, thereby making it possible to start receiving immediately. In view of the fact that the local frequency is controlled within an optical FDM receiver equipment, the advantage results that the local frequency continues to be controlled in stable manner even when the optical FDM signal is not applied to an optical receiving equipment. Further, a tuning error is avoided even if a given channel is missed in an optical FDM signal.

3. Embodiment of Transmission System Connections

Figure 9A:
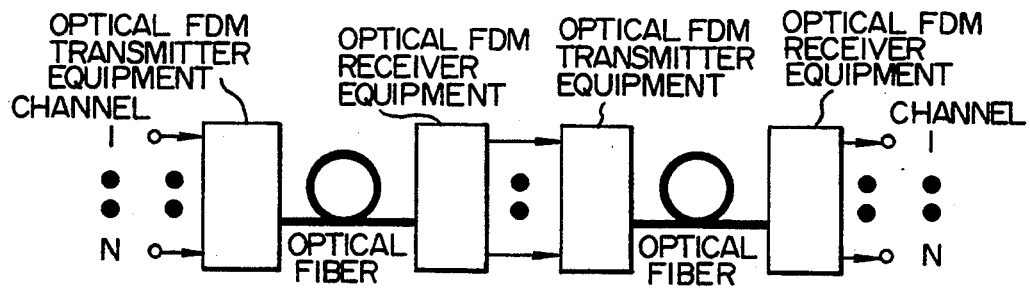
FIGS. 9A to 9C are a diagram showing a connection of a transmission system according to the present invention.
Figure 9B:
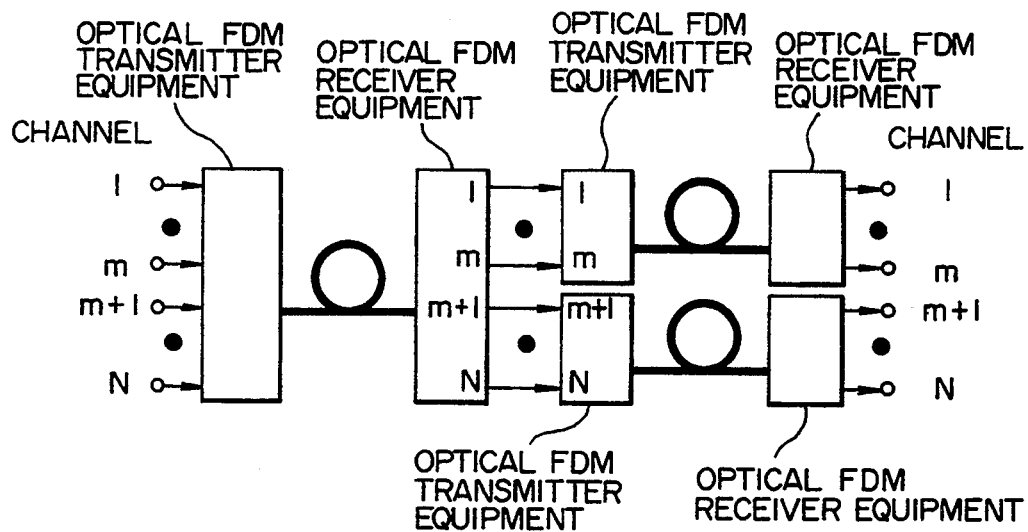
Figure 9C:
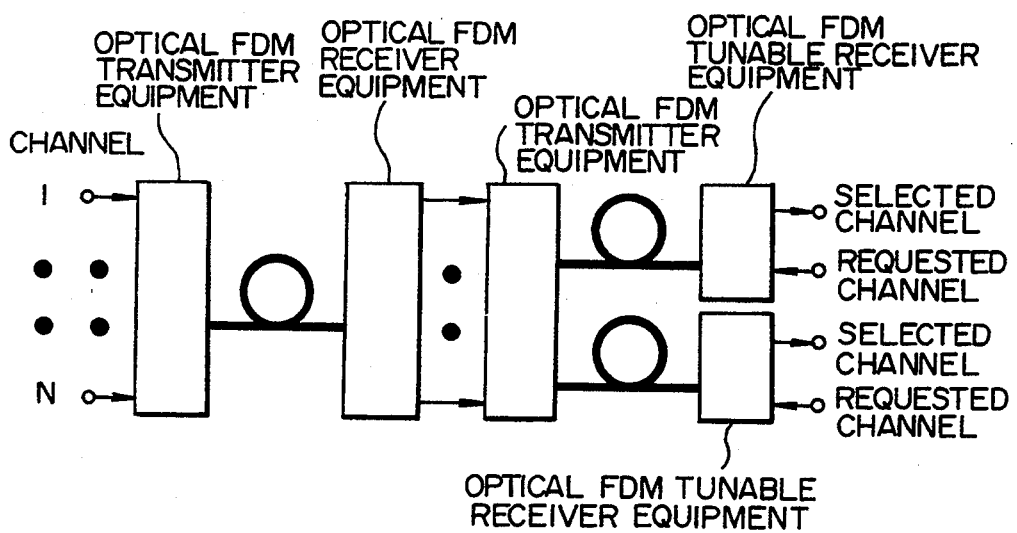

An example of connections of a transmission system according to the present invention is shown in FIG. 9. FIG. 9A shows two transmission systems connected in cascade according to the present invention capable of transmitting an N-channel signal. This configuration permits the total transmission distance to be lengthened as compared with the case where a single transmission system is used. The total transmission distance can also be lengthened by increasing the number of units connected (to three or more) or by connecting an optical amplifier to an optical fiber. FIG. 9B shows a case in which a transmission system capable of transmitting a number m of channels (1 to m), and a transmission system capable of transmitting (N−m) channels (m+1 to N) in the latter stages of the transmission system according to the present invention capable of transmitting an N-channel signal. This configuration makes it possible to divide N channels and transmit parts thereof to different places. Assuming, for example, that an optical FDM receiver equipment of a transmission system capable of transmitting a number m of channels and an optical FDM receiver equipment capable of transmitting (N−m) channels are arranged at different places, signals of channels 1 to m and those of channels m+1 to N can be transmitted to different places. If the method of dividing channels and the number of divisions are changed, the number of places to which transmission is made is increased. Also, if the configuration of FIG. 9A is combined with that shown in FIG. 9B, the required channel can be transmitted divided to different places very far from each other. FIG. 9C shows a transmission system according to a second embodiment connected in the latter stages of the transmission system according to the first embodiment of the present invention. According to this configuration, an N-channel signal can be distributed among a plurality of different places. Further, an N-channel signal can be distributed among a plurality of places very far from each other, if the configurations shown in FIGS. 9A, B and C are combined with each other. Furthermore, the transmission distance can be lengthened even more by connecting an optical amplifier to the optical fiber. Also, if the optical FDM transmitter equipment and the optical FDM receiver equipment other than those at the sending end are replaced, in whole or in part, by an optical amplifier in FIGS. 9A to C, the optical FDM transmission system can be further simplified.

4. Other Embodiments

Figure 10:
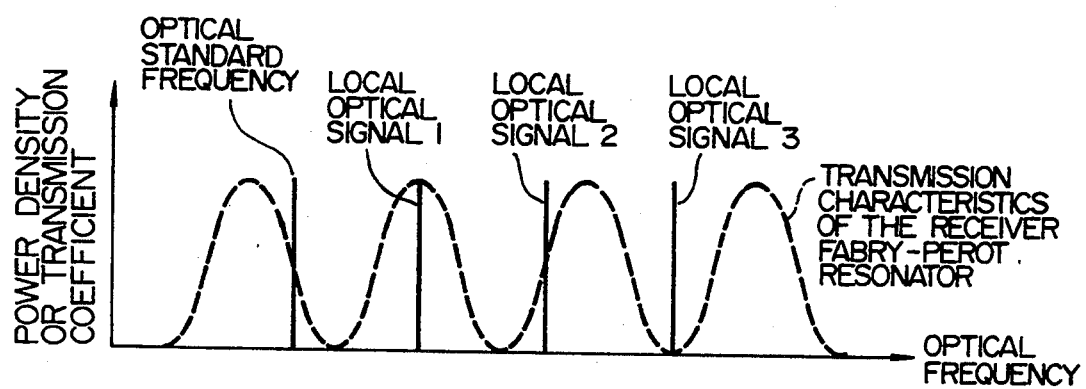
FIG. 10 shows another example of arrangement of the optical frequency of local optical signal and the transmission characteristic of a Fabry-Perot resonator.
Figure 11:
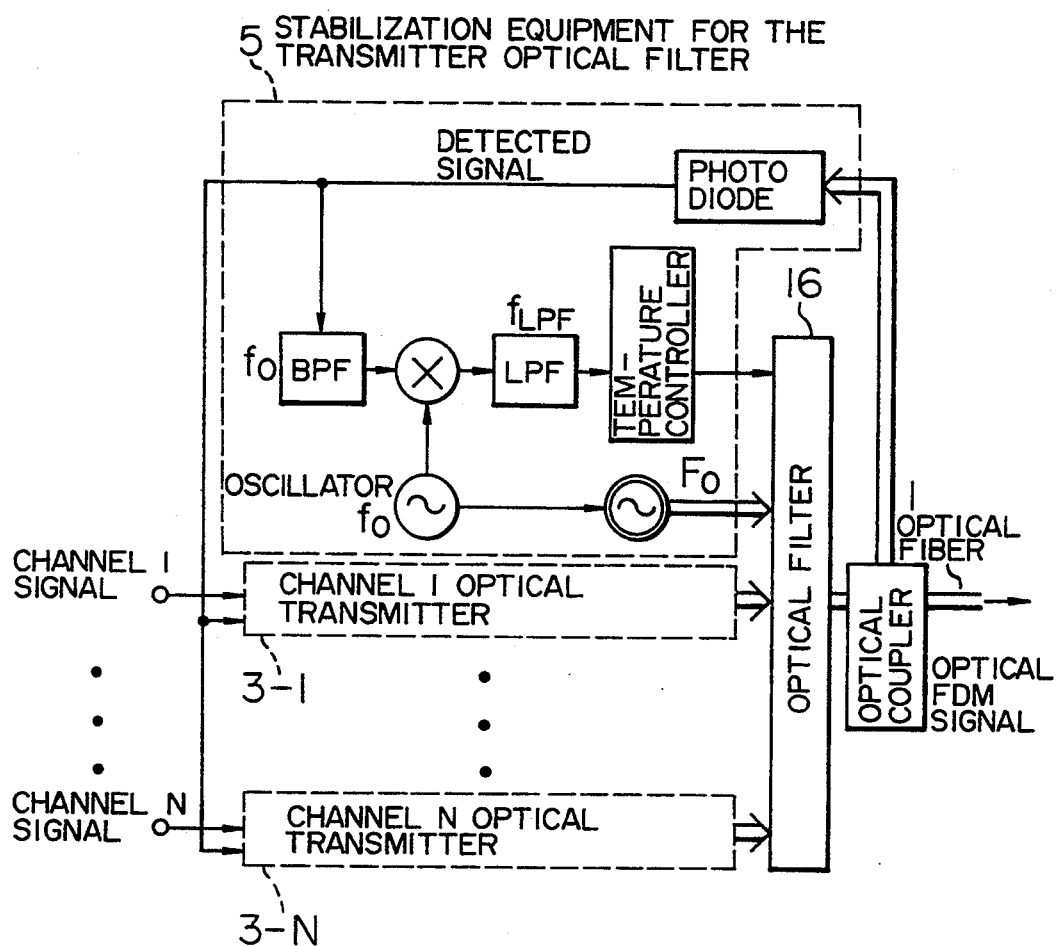
FIG. 11 is a diagram showing a configuration of another embodiment of an optical FDM transmitter equipment.

The present invention is not limited to the above-mentioned embodiments. The transmission and receiving Fabry-Perot resonators, for instance, are not necessarily required to have a transmission characteristic specified in FIG. 3. An example is shown in FIG. 10. In FIG. 10, the local optical signal 1 is stabilized to an optical frequency associated with a peak transmission coefficient of a transmission Fabry-Perot (FP) resonator, the local optical signal 2 to an optical frequency associated with other than a peak or minimum transmission coefficient, and the local optical signal 3 to an optical frequency associated with a minimum transmission coefficient. The stabilization to an optical frequency associated with other than a peak or minimum transmission coefficient of the FP resonator is realized by controlling the error signal to approach not zero but a reference voltage other than zero. The stabilization to an optical frequency associated with a minimum transmission coefficient, on the other hand, is achieved, for example, by reversing the polarity of an error signal of a receiving optical filter stabilization equipment in FIG. 2. Specifically, a similar effect is obtained to the extent that the transmission coefficient of the FP resonator in the transmitter and receiver equipment is stabilized by an optical standard frequency and at the same time the frequencies of the transmission optical source and the local optical sources in the transmitter and receiver equipment are stabilized with reference to the transmission coefficient of an optical filter. Also, even when the frequency of an optical source for the optical standard frequency is different between the transmitter and receiver equipment, an effect similar to that of the above-mentioned embodiment is obtained as long as the respective frequencies are known. In the case where N is 1, i.e., even when an FDM transmission is not involved, on the other hand, a similar effect is obtained. Also, the transmission rate may be varied from one channel to another. In any way, the purpose is served as long as the intermediate frequency obtained at a heterodyne optical receiver is substantially coincident with a design value. A similar effect is obtainable also by use of an optical filter of Mach-Zehnder type in place of an FP resonator. A method other than mentioned above may be used for stabilization of the optical signal frequency in an optical FDM transmitter equipment. For example, an oscillator and a bandpass filter different in frequency as in the case of optical FDM receiver equipment may be installed in each optical transmitter to stabilize the optical signal frequency on the same principle as in the optical FDM receiver equipment. As a result, the above-mentioned effect is obtained to the extent that an optical signal frequency as shown in FIG. 3 is obtained. Also, the optical multiplexer and the optical demultiplexer used in the optical FDM transmitter and receiver equipment may be either an optical star coupler or a combination of an optical multiplexer/demultiplexer and an optical star coupler. Further, in spite of the fact that in FIG. 3, both the signal frequency and the local frequency are stabilized to a frequency level associated with a peak transmission coefficient of an FP resonator, it may not necessarily be stabilized to a frequency associated with a peak transmission coefficient. Instead, the frequency to which stabilization is made may be the one associated with a minimum transmission coefficient or an appropriate frequency point between peak and minimum transmission coefficients. In short, the purpose is served if the difference between an optical signal frequency and a local frequency is equal to the desired intermediate frequency $f_{IF}$. This is also the case with the relation between an optical standard frequency and the transmission coefficient of an FP resonator. Also, instead of subjecting the light from an optical source with the optical standard frequency to frequency modulation through an optical frequency modulator in the transmission and receiving optical filter stabilization equipment, the optical source for the optical standard frequency may alternatively be directly modulated to produce a frequency-modulated light. It is well known that in the case where the optical source for the optical standard frequency is a semiconductor laser, for instance, a frequency-modulated light is obtainable by modulating a current injected into the semiconductor laser. An example of configuration of a transmission optical filter stabilization equipment used for direct modulation of an optical source is shown in FIG. 11. Also, an optical filter at the sending end may be used as an optical multiplexer in an optical FDM transmitter equipment at the same time. This sharing is realized by using an optical filter of Mach-Zehnder type at the sending end. An example of configuration of the optical FDM transmitter equipment in the case of shared use is shown in FIG. 11. The transmission optical filter stabilization equipment (designated by 15 in FIG. 11) and the optical transmitters are configured the same way as in FIG. 1. In spite of this, the optical coupler in the transmission optical filter stabilization equipment is eliminated, and the output light from each optical transmitter is applied to an optical filter of Mach-Zehnder type (designated by 16 in FIG. 11). The optical FDM signal outputted from an optical filter is divided into two branches, one being sent to an optical fiber and the other to a photodiode in the transmission filter stabilization equipment thereby to stabilize each optical signal frequency on the same principle as in FIG. 1. According to this configuration, the optical FDM transmitter equipment is simplified as compared with FIG. 1. In similar fashion, the optical FDM receiver equipment can be simplified as compared with FIG. 2 or 6 by being configured in such a manner that a multiplexer for multiplexing a plurality of local optical signals is used as an optical filter at the receiving end at the same time.

As will be seen from the foregoing description, according to the present invention, an optical signal frequency and a local frequency are controlled (stabilized and tuned) independently of each other at an optical FDM transmitter equipment and an optical receiver equipment respectively, and therefore the local frequency can continue to be controlled in stable manner even when an optical signal fails to be applied to an optical FDM receiver equipment due to such causes as the breakage of an optical fiber or a fault of the transmission light source.

Figure 12:
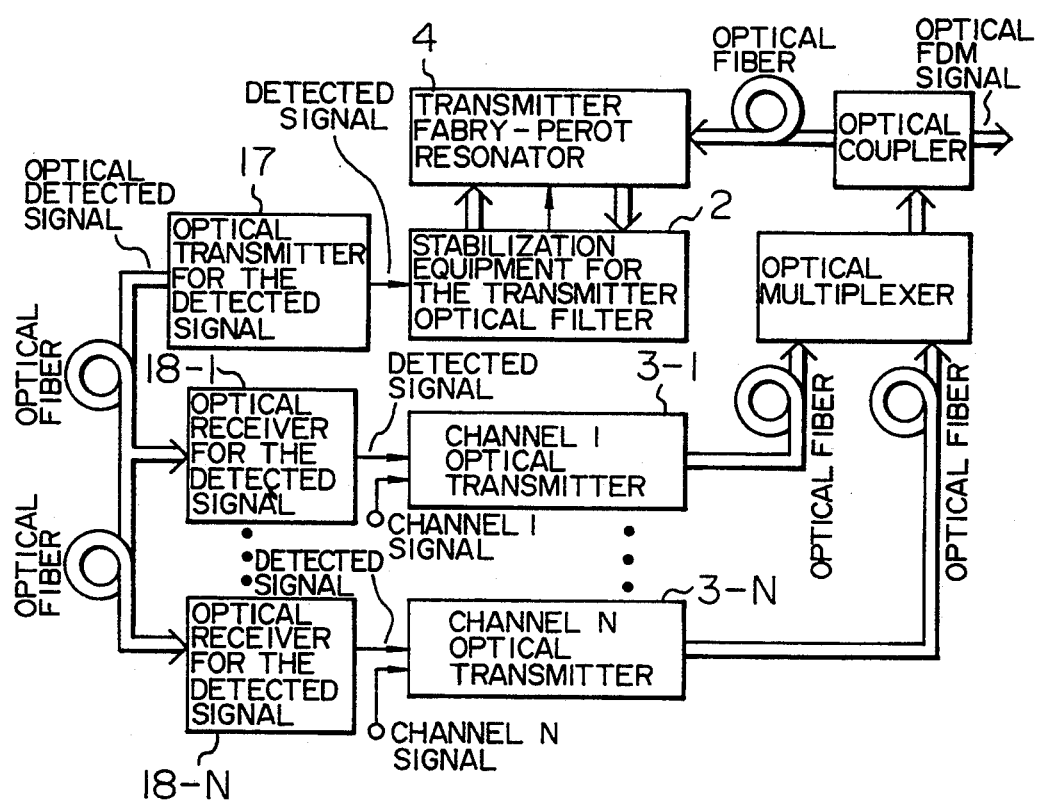
FIG. 12 shows a configuration of still another embodiment of an optical FDM transmitter equipment.

In addition, the above-mentioned advantage is obtained even when the optical transmitter of each channel and the transmission optical filter stabilization equipment making up an optical FDM transmitter equipment according to the present invention are arranged at different places. FIG. 12 shows an embodiment involving such a case. According to this embodiment, in order to transmit a detected signal to a remote channel optical transmitter, a detected signal optical transmitter 17 for producing a detected signal converted into an optical signal (optical detected signal) is applied to an optical FDM transmitter equipment on the one hand and a detected signal optical receiver 18 for receiving an optical detected signal is installed in an optical transmitter of each channel on the other hand. The other parts of the configuration are identical to those in FIG. 1. Another advantage of this configuration is that information supplied from a remote place can be multiplexed to produce an optical FDM signal. Another embodiment providing an improvement of the above-mentioned embodiment is shown in FIG. 13. According to this embodiment, the optical transmitter of each channel includes a heterodyne optical receiver 7 shown in FIG. 2 to constitute an optical transmitter/receiver. This configuration leads to the advantage that a signal can be both transmitted and received between remote places. Further, there is provided a demultiplexer in each optical transmitter/receiver for demultiplexing an optical detected signal, resulting in the advantage that the optical fiber that has so far been used only for transmission of an optical detected signal can be used also for transmission of an optical FDM signal at the same time.. The above-mentioned heterodyne optical receiver may of course be replaced with equal effect by an optical receiver of direct detection type with a tunable optical filter. The use of an optical transmitter/receiver as shown in FIG. 13 realizes a system or a network configuration other than shown in FIG. 9. An example is shown in FIG. 14.

Figure 14:
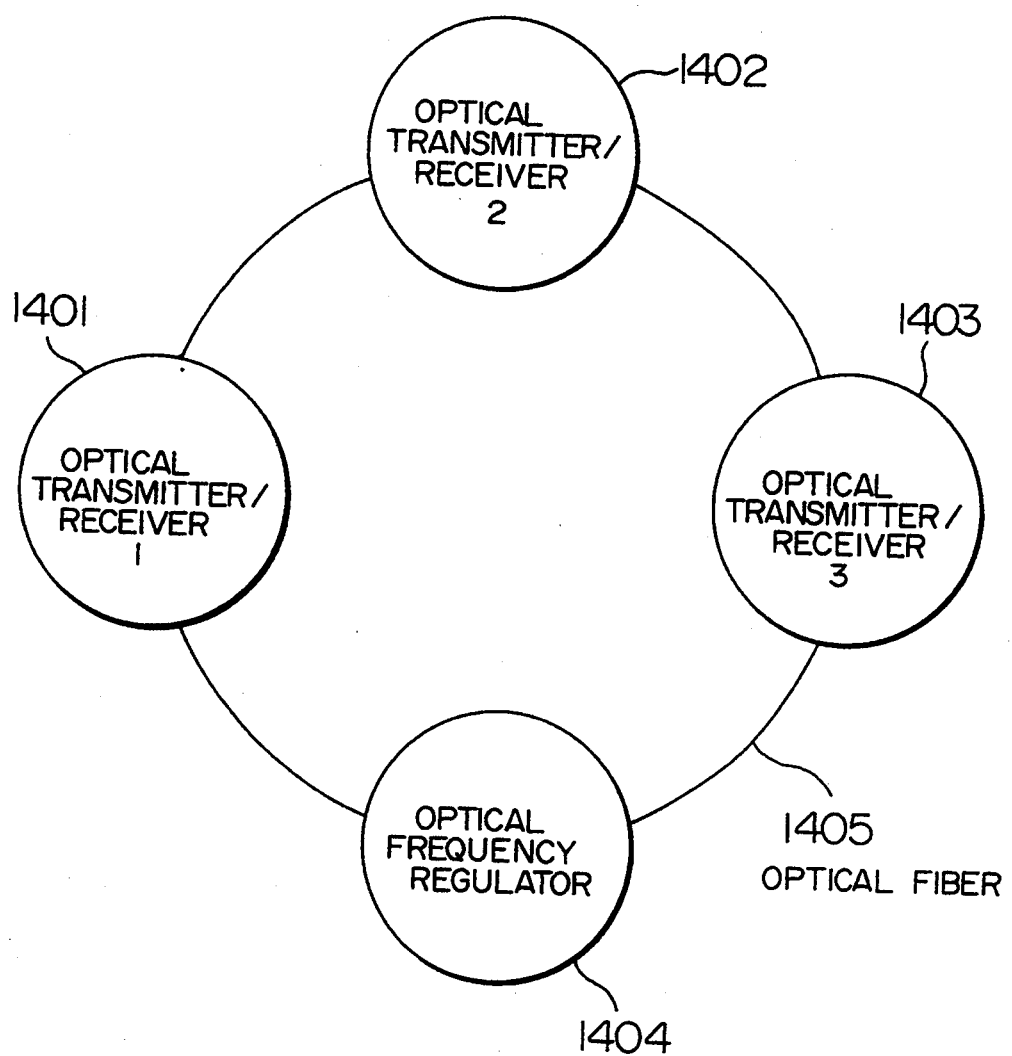
FIG. 14 is a diagram showing a configuration of an embodiment in which a frequency stabilization system according to the present invention is applied to an optical frequency division multiplexing network.

FIG. 14 shows a configuration of an embodiment in which a frequency stabilization system according to the present invention is applied to an optical network of optical frequency division multiplexing type. A plurality of optical transmitter/receivers 1401, 1402, 1403 and an optical frequency regulator 1404 are connected in loop by an optical fiber 1405. Each of the optical transmitter/receivers 1401, 1402, 1403 has a laser providing an optical source of a specific frequency. Although the embodiment shown in FIG. 14 represents a case in which a single optical frequency regulator 1404 is included in the network, a plurality of optical frequency regulators may be constructed in the network. Since the optical network according to this embodiment is of an optical frequency division multiplexing type, the frequencies of optical signals outputted from the optical transmitter/receivers 1401, 1402, 1403 are different from each other. The function of the optical frequency regulator 1404 is to stabilize the optical frequency of the optical sources of the optical transmitter/receivers 1401, 1402, 1403 to a regulated value in order to prevent the interference between the three optical signals.

For this purpose, the optical frequency regulator 1404 internally determines three stable regulated optical frequencies different from each other. The optical frequency regulator 1404 receives a part of the optical signals from the optical transmitter/receivers 1401, 1402, 1403 connected by the optical fiber 1405, and determines the deviation between the frequencies of the three optical signals and corresponding regulated optical frequencies respectively. These values of deviation are carried on an optical signal (by subjecting an optical signal to frequency modulation with the deviation value, or otherwise) and are transmitted to the corresponding optical transmitter/receivers 1401, 1402, 1403 through the optical fiber 1405. The optical transmitter/receivers 1401, 1402, 1403 select deviation values associated therewith respectively from a plurality of deviation values contained in the optical signal received from the optical frequency regulator 1404, and correct the frequencies of the respective optical sources in such a manner as to obtain a deviation of 0 or a predetermined value. This series of operations stabilize the frequencies of the optical signals produced by the optical transmitter/receivers 1401, 1402, 1403 in conformity with or with a predetermined offset from the regulated optical frequency determined by the optical frequency regulator 1404. According to the present embodiment, each value of deviation may be transmitted to each optical transmitter/receiver by use of an electrical signal instead of an optical signal. In the case where an electrical signal is used for transmission, the optical frequency regulator 1404 and each of the optical transmitter/receivers 1401, 1402, 1403 may be connected only by electric wires apart from the configuration shown in FIG. 14. Also, the optical frequency regulator 1404 and the optical transmitter/receivers 1401, 1402, 1403 may be coupled not in loop but in star.

According to the present embodiment, the deviation between the value of a regulated optical frequency in the optical frequency regulator 1404 and the frequency of the optical signal outputted from each optical transmitter/receiver is determined at the optical frequency regulator 1404 and is transmitted to the optical transmitter/receivers 1401, 1402, 1403, which in turn correct the optical frequencies of their own optical sources accordingly. As an alternative, the system may comprise means for transmitting the optical signal itself of a regulated optical frequency internally determined by the optical frequency regulator 1404, directly to the corresponding optical transmitter/receivers 1401, 1402, 1403, so that the optical transmitter/receivers may detect the deviation between the optical signal thus sent and their own optical signals respectively and control their own optical frequencies in such a manner as to keep the deviation frequency at zero or a predetermined value.

Although the embodiment shown in FIG. 14 includes a single transmission optical source in each optical transmitter/receiver, the optical frequencies of a plurality of transmission optical sources which may be provided in each optical transmitter/receiver may be regulated in exactly the same manner by means of a frequency regulator. Further, the optical frequency of a local optical source included in the receiving section of each optical transmitter/receiver, which is not described above, may be regulated by a frequency regulator in similar fashion.

Explanation will be made about an embodiment of the optical transmitter/receivers 1401, 1402, 1403 and the optical frequency regulator 1404 applied to a case embodying a frequency stabilization system according to the present invention in the optical network shown in FIG. 14.

Figure 15A:
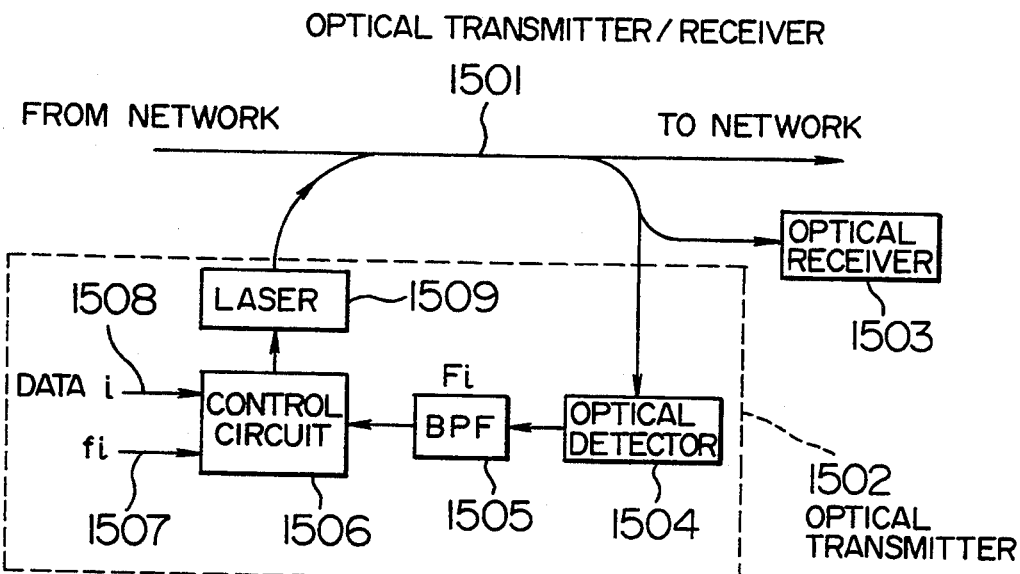
FIGS. 15A and 15B are a diagram showing a configuration of a first embodiment of an optical frequency regulator and an optical transmitter/receiver of an optical frequency stabilization system shown in FIG. 14.
Figure 15B:
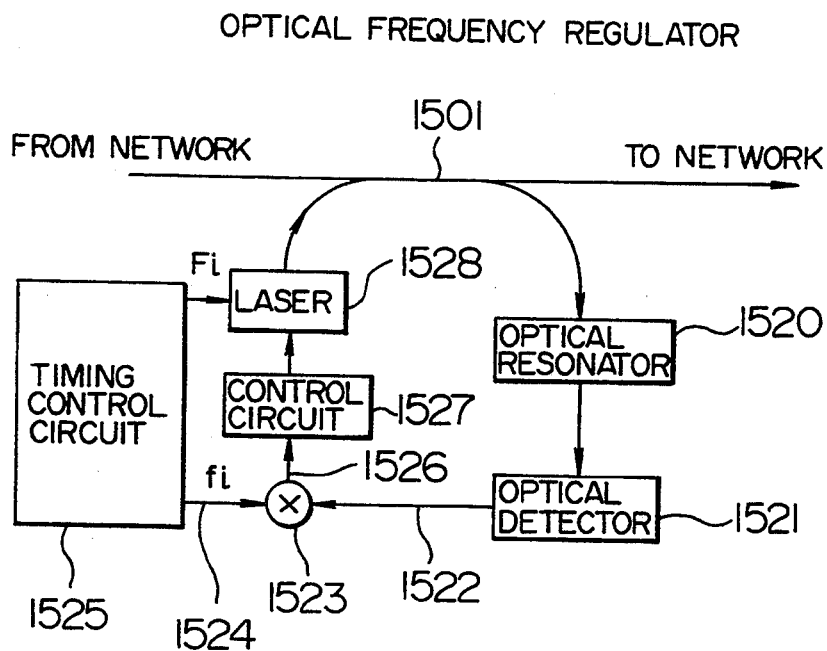

FIG. 15 is a diagram showing a configuration of a first embodiment of the optical transmitter/receiver and the optical frequency regulator in the optical frequency stabilization system shown in FIG. 14. FIG. 15A shows a configuration of an optical transmitter/receiver and FIG. 15B an optical frequency regulator. According to this embodiment, the deviation between the actual optical frequency of an optical source of each of the optical transmitter/receivers 1401 to 1403 and that of each optical transmitter/receiver regulated by the optical frequency regulator is transmitted to each optical transmitter/receiver by use of an optical signal from an optical frequency regulator 1404.

The laser 1509 in the optical transmitter 1502 of the optical transmitter/receiver has the optical frequency thereof regulated by the control circuit 1506 in such a manner as to be differentiated from the optical frequency of the laser of the remaining optical transmitter/receivers. Also, the laser 1509 is modulated by a data i1508 providing information to be transmitted, and is further subjected to fine frequency modulation by a signal 1507 of a frequency fi specific to the optical transmitter/receiver. The optical signal outputted from the laser 1509 is led to an optical network by the optical fiber 1501.

The optical frequency regulator 1404 shown in FIG. 15B includes an optical resonator 1520 made up of a Fabry-Perot resonator having a periodic transmission characteristic on the optical frequency axis. According to the present embodiment, a plurality of frequencies associated with an optical signal which is transmitted through the optical resonator 1520 and has a maximum intensity are used as regulated optical frequencies of the optical transmitter/receivers 1401, 1402, 1403. As an alternative, frequencies associated with an optical signal intensity reflected on the optical resonator 1520 and having a minimum value may be employed as regulated optical frequencies. A part of the optical frequency division multiplexing signal sent from the optical transmitter/receivers 1401, 1402, 1403 by the optical fiber 1501 is applied to the optical resonator 1520, and after being converted into an intensity signal, is detected by an optical detector 1521. The signal 1522 thus detected is synchronously detected with a signal 1524 having an inherent frequency fi (i=1, 2, 3) by a mixer 1523. This synchronous detection is effected by a timing control circuit 1525 in time division. An output signal 1526 from the mixer 1523 makes up a deviation between the frequency fi of an optical signal outputted from the i-th optical transmitter/receiver and the resonance frequency of the optical resonator 1520 corresponding to the optical frequency fi. As a result, the laser 1528 is modulated by the deviation signal 1526 through the control circuit 1527, and the deviation data is transmitted as an optical signal to each of the transmitter/receivers 1401, 1402, 1403 through the optical fiber 1501. In the process, for discrimination from the deviation data for the other optical transmitter/receivers, the laser 1528 is subjected to intensity modulation by a signal of a frequency Fi in advance.

The optical transmitter/receiver receives a part of the optical signal holding the above-mentioned deviation data sent from the optical fiber 1501 and intensity-modulated by the signal of frequency Fi. The signal thus received is divided into two parts, one being sent to the optical receiver 1503, and the other to the optical transmitter 1502. The optical signal received by the optical transmitter 1502 is converted into an electrical signal by the optical detector 1504. This electrical signal contains a deviation signal of the transmitter/receiver. In order to discriminate this signal from the deviation data of the other transmitter/receivers, only a deviation signal subjected to intensity modulation at Fi is taken out by use of a bandpass filter 1505. On the basis of this deviation signal, the control circuit 1506 corrects the optical frequency of the laser 1509. The configuration shown in FIG. 15 causes the optical frequency of the laser 1509 of the transmitter 1502 of each optical transmitter/receiver to coincide with a given resonance frequency of the optical resonator 1520. The coincidence between the optical frequency of the laser of each optical transmitter/receiver with adjacent resonant frequencies of the optical resonator 1520 makes it possible to secure equal channel intervals.

Figure 16A:
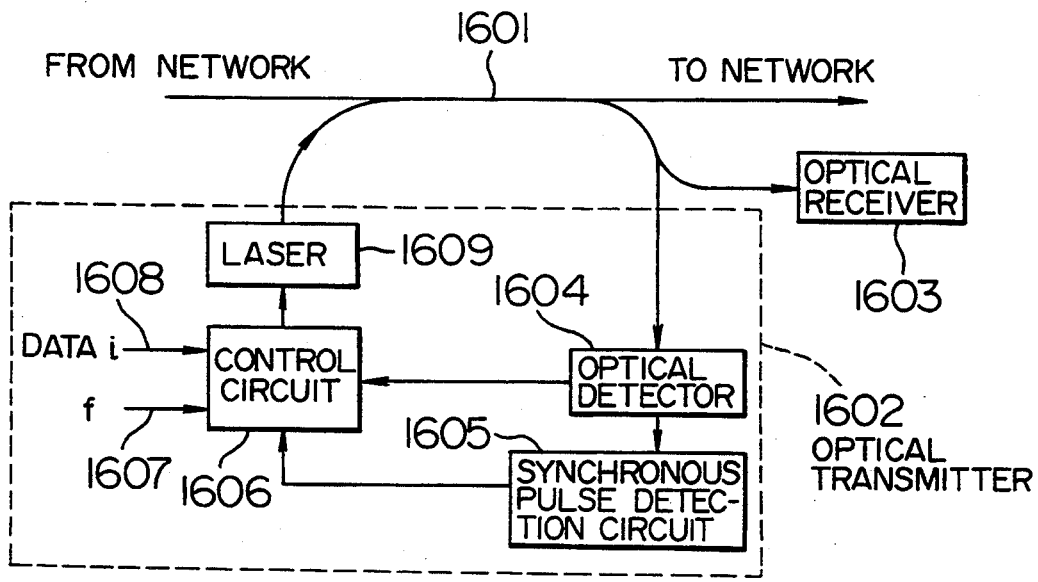
FIGS. 16A and 16B are a diagram showing a configuration of a second embodiment of an optical frequency regulator and an optical transmitter/receiver of an optical frequency stabilization system shown in FIG. 14.
Figure 16B:
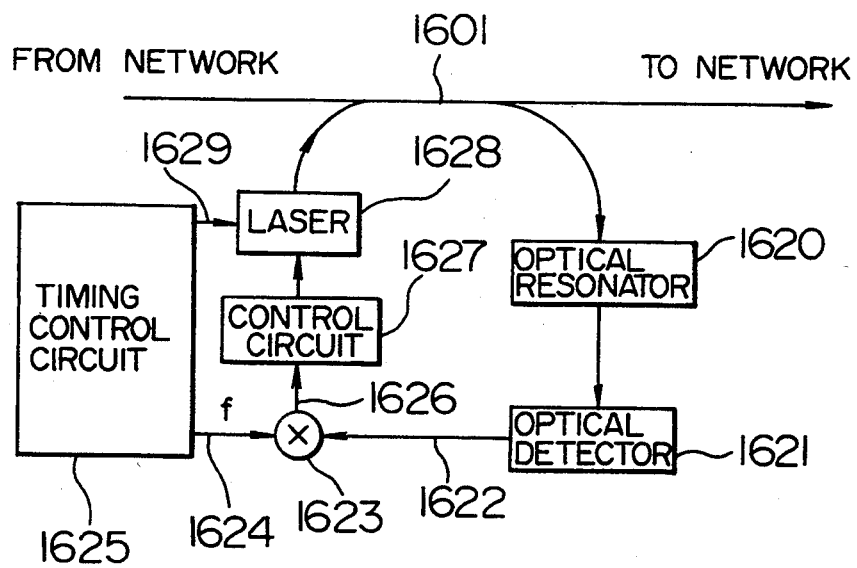

FIG. 16 is a diagram showing a configuration of a second embodiment of the optical transmitter/receiver and the optical frequency regulator of the optical frequency stabilization system shown in FIG. 14. FIG. 16A shows a configuration of the optical transmitter/receiver, and the FIG. 16B that of the optical frequency regulator. According to this embodiment, in order to send the deviation value from the optical frequency regulator while discriminating the optical transmitter/receiver, the optical frequency regulator is synchronized with each optical transmitter/receiver thereby to transmit an optical signal carrying the deviation data in time division. The sync signal resulting from the modulation of the laser 1628 with the signal 1629 from the timing control circuit 1625 shown in FIG. 16B is applied through the optical fiber 1601 to each optical transmitter/receiver. The optical detector 1604 shown in FIG. 16A converts an optical signal into an electrical signal, and the sync detector 1605 detects the sync signal 1629. The control circuit 1606, during its own transmission time, subjects the laser 1609 to fine frequency modulation with the signal 1607 of frequency f on the basis of a detected sync signal, and applies an optical signal to the optical fiber 1601. This optical signal is transmitted through the optical resonator 1620 as shown in FIG. 16B and is converted into an electrical signal. This electrical signal 1622 is subjected to synchronous detection by the signal 1624 of frequency f. The laser 1628 is modulated with a deviation signal 1626 and transmitted to the optical transmitter/receiver. In this configuration, there is only one laser in the optical transmitter/receiver which is frequency-modulated with frequency f at a given time point, and only the particular laser 1609 in the optical transmitter/receiver is corrected.

Figure 17A:
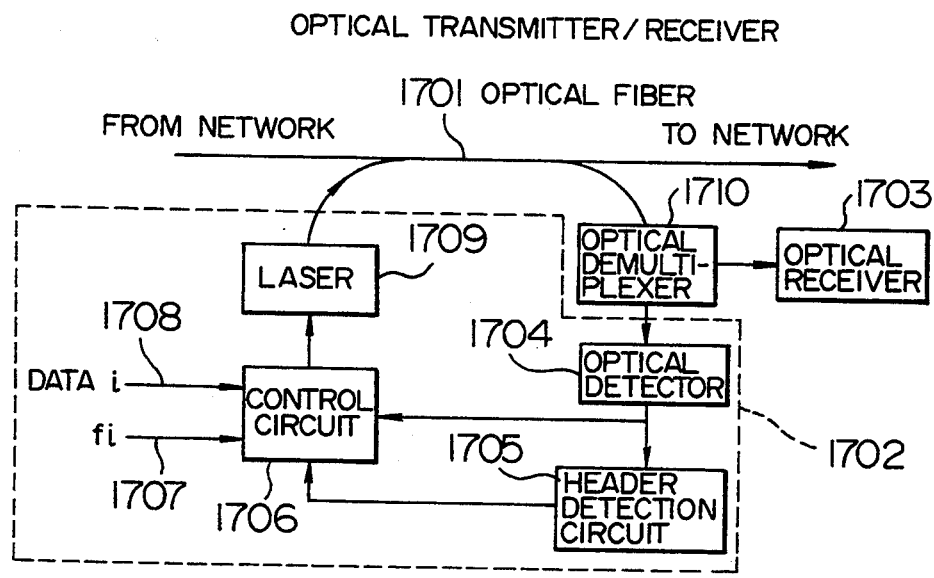
FIGS. 17A and 17B are a diagram showing a third embodiment of an optical frequency regulator and an optical transmitter/receiver of an optical frequency stabilization system shown in FIG. 14.
Figure 17B:
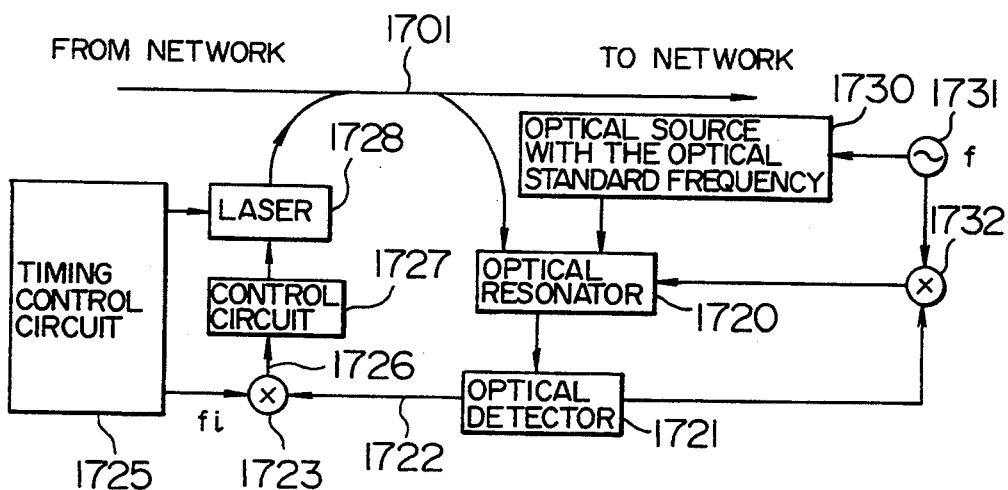

FIG. 17 is a diagram showing a configuration of a third embodiment of the optical transmitter/receiver and the optical frequency regulator of the optical frequency stabilization system shown in FIG. 14. FIG. 17A shows a configuration of an optical transmitter/receiver, and FIG. 17B that of an optical frequency regulator. According to this embodiment, in order to discriminate the optical transmitter/receivers 1401 to 1403 in transmitting a deviation data from the optical frequency regulator 1404, a header specific to each optical transmitter/receiver is attached to the optical signal carrying the deviation value. Specifically, an optical signal outputted from the laser 1728 of the optical frequency regulator contains a header for discriminating each optical transmitter/receiver as well as the deviation value thereof.

Each optical transmitter/receiver takes in only a deviation sent with an optical signal carrying a header specific to itself detected by a header detector 1705 from the output of the optical detector 1704 as shown in FIG. 117A, thereby correcting the optical frequency of the laser 1709. In the example under consideration, the wavelength band of an optical signal for transmitting the data i1708 is differentiated from that of an optical signal for transmitting the deviation. Specifically, the lasers 1709 and 1728 belong to wavelength bands different from each other. In the optical transmitter/receiver, the use of a demultiplexer 1710 makes it possible to isolate a received optical signal into the optical transmitter 1702 and the optical receiver 1703. In the configuration shown in FIG. 17, the signal $f_i1707$ of the control circuit 1706 and the signal 1708 of the data i correspond to the signal $f_i1507$ of the control circuit 1506 and the data i signal 1508 respectively, while the mixer 1723, the timing control circuit 1725, the signal 1726 and the control circuit 1727 correspond respectively to the mixer 1523, the timing control circuit 1525, the signal 1526 and the control circuit 1527.

Also, the optical resonator 1720 shown in FIG. 17B is controlled in such a manner as to resonate at the optical frequency of the standard light 1730. This control makes it possible to connect a plurality of optical networks having a plurality of optical transmitter/receivers to each other. Specifically, if a plurality of optical resonators having the same characteristic are controlled to resonate at the frequency of a standard light shared by them by an optical frequency regulator in an optical network, then the frequencies of optical signals outputted from the optical transmitter/receivers in a plurality of optical networks can be integrally controlled. For this purpose, the standard light 1730 is frequency-modulated in advance by use of the signal source 1731 of frequency f. The output signal from the optical detector 1721 is applied to the mixer 1732 with the signal of the signal source 1731 thereby to produce a signal for controlling the optical resonator 1720. This signal corresponds to a relative deviation of a resonance frequency of the optical resonator 1720 for the optical frequency of the standard light 1731. As a result, when this signal is negatively fed back to the optical resonator 1720, one of the resonance frequencies of the optical resonator 1720 comes to coincide with the optical frequency of the standard light 1730.

Figure 18A:
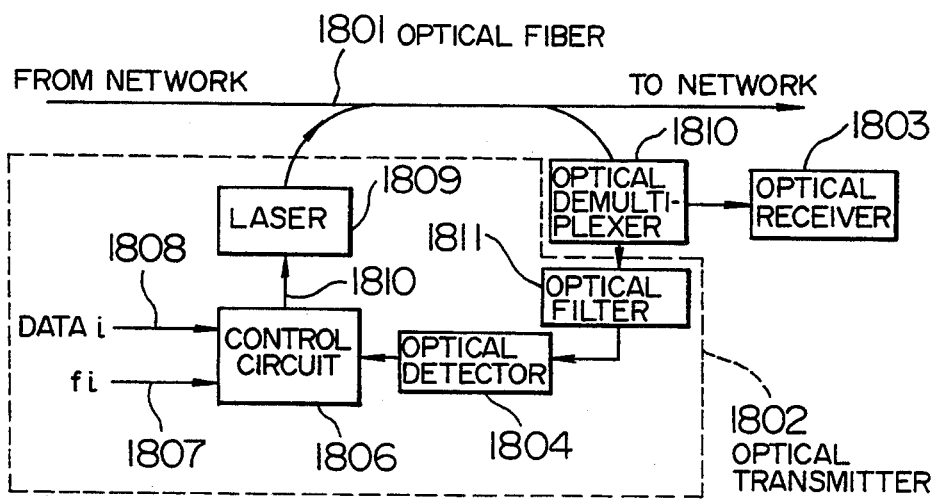
FIGS. 18A and 18B are a diagram showing a fourth embodiment of an optical frequency regulator and an optical transmitter/receiver of an optical frequency stabilization system shown in FIG. 14.
Figure 18B:
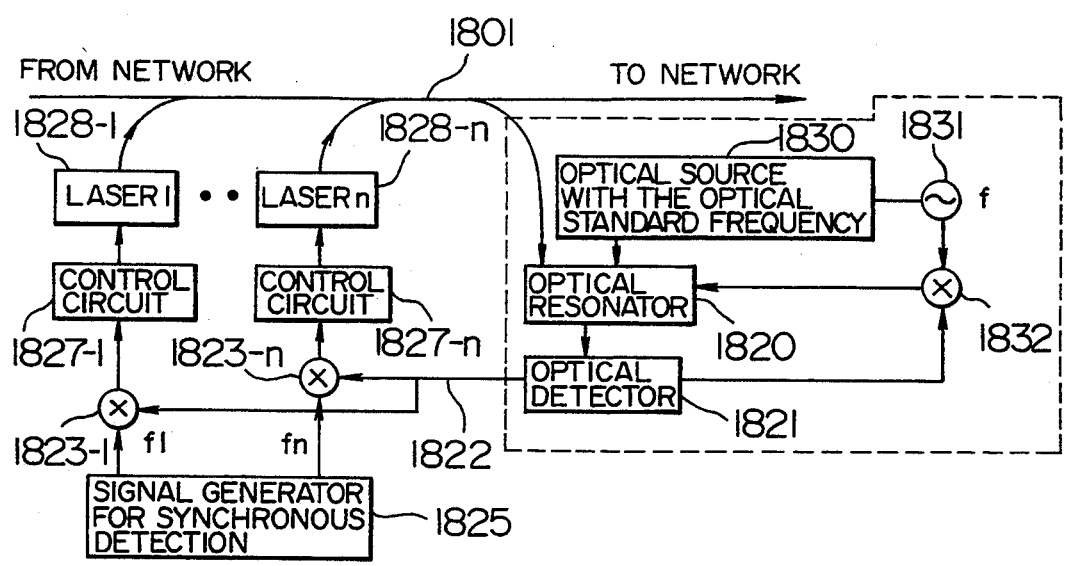

FIG. 18 is a diagram showing a configuration according to a fourth embodiment of the optical transmitter/receiver and the optical frequency regulator of the optical frequency stabilization system shown in FIG. 14. FIG. 18A shows a configuration of the optical transmitter/receiver and FIG. 18B a configuration of the optical frequency regulator. According to the embodiment under consideration, a plurality of deviation values corresponding to a plurality of optical transmitter/receivers from the optical frequency regulator are transmitted to the respective optical transmitter/receivers by being carried on optical signals of different optical frequencies. Specifically, the optical frequency regulator has as many lasers 1828-1, ..., 1828-n with different optical frequencies as the optical transmitter/receivers as shown in FIG. 18B. The lasers 1828-1, ..., 1828-n are controlled respectively by the control circuits 1827-1, ..., 1827-n, which in turn are energized by the outputs of mixers 1823-1, ..., 1823-n supplied with the outputs of the optical detector 1821 and the frequency signals $f_1, \ldots, f_n$ from the synchronous detection signal generator 1825.

Each optical transmitter/receiver receives only an optical signal carrying its own deviation value by use of an optical filter 1811. According to the present embodiment, a number n of deviation values can be transmitted at a time.

The optical fiber 1801, the optical transmitter 1802, the optical receiver 1803, the optical detector 1804, the control circuit 1806, the frequency signal fi1807, the data i1808, the laser 1809 and the demultiplexer 1810 of the optical transmitter/receiver correspond to the optical fiber 1701, the optical transmitter 1702, the optical receiver 1703, the optical detector 1704, the control circuit 1706, the frequency signal $f_i1707$, the data i1708, the laser 1709 and the demultiplexer 1710 in FIG. 17, respectively. Also, the functions and configurations of the optical resonator 1820, the optical detector 1821, the standard light 1830, the signal source 1831 and the mixer 1832 of the optical frequency regulator are identical to those of the optical resonator 1720, the optical detector 1721, the standard light 1730, the signal source 1731 and the mixer 1732 in FIG. 17, respectively.

The embodiment of FIG. 18 may be configured of a single laser by integrating a plurality of lasers 1828-1, ..., 1828-n. Specifically, the illuminance frequency is changed by changing the temperature, current, etc. of the laser to send a deviation. In this case, a plurality of deviation values are transmitted in time division.

Figure 19A:
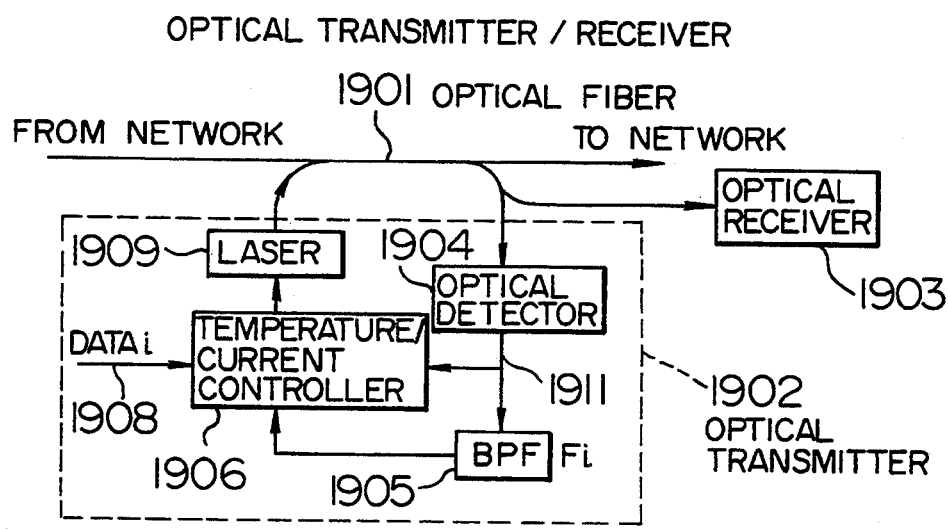
FIGS. 19A and 19B are a diagram showing a fifth embodiment of an optical frequency regulator and an optical transmitter/receiver of an optical frequency stabilization system shown in FIG. 14.
Figure 19B:
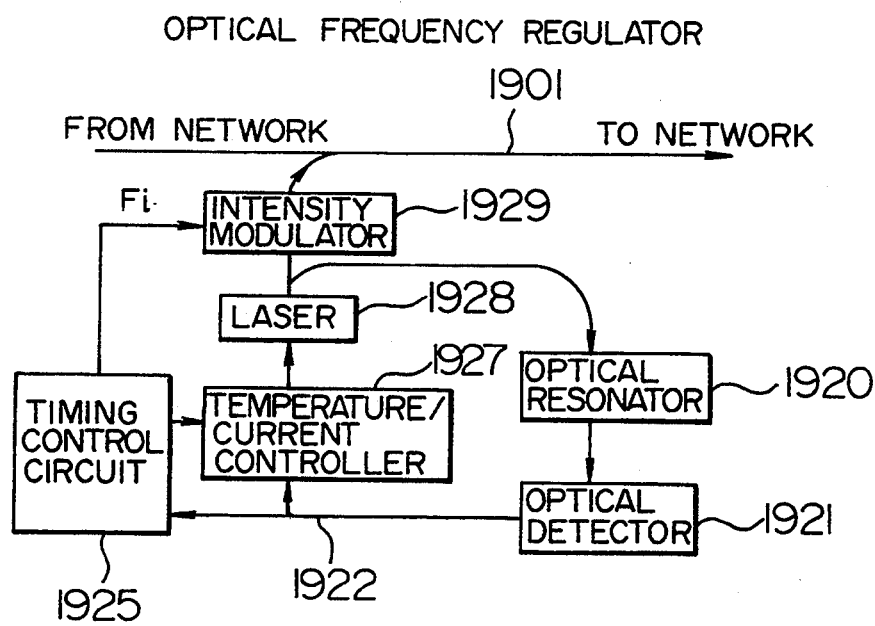

FIG. 19 is a diagram showing a configuration of each part of the optical frequency stabilization system shown in FIG. 14 according to a fifth embodiment. FIG. 19A shows a configuration of an optical transmitter/receiver, and FIG. 19B that of an optical frequency regulator. According to this embodiment, optical signals of a plurality of regulated frequencies determined by the optical frequency regulator are transmitted to the respective optical transmitter/receivers, which correct the optical frequencies of their respective lasers in such a manner that the deviation between the respective received optical signals and the optical signals of the respective lasers assume zero or a predetermined value. This embodiment is such that in order to generate optical signals of a plurality of regulated frequencies by the optical frequency regulator, the temperature, current, etc. of the laser are changed. As will be naturally understood, according to the present embodiment, only an optical signal of a single regulated frequency can be transmitted at a time.

A part of the optical signals of the laser 1928 in the optical frequency regulator is introduced to the optical resonator 1920. The optical frequency of the laser 1928 is swept by the temperature/current control circuit 1927. The light transmitted through the optical resonator 1920 is detected by the optical detector 1921. The signal 1922 thus detected is applied to the temperature/current control circuit 1927 and the timing control circuit 1925. Once the optical frequency of the laser 1928 coincides with the resonance frequency of the optical resonator 1920, the signal transmitted through the optical resonator 1920 increases, thereby increasing the detected signal 1922. The sweeping of the laser 1928 is stopped by the timing control circuit 1925. The optical frequency of the laser 1928 at this time point is defined as the optical frequency of the i-th transmitter. This optical signal is subjected to intensity modulation with the signal 1927 of frequency Fi from the timing control circuit 1925 by an intensity modulator 1929 and sent out to the network by the optical fiber 1901. After that, the sweeping of the optical frequency of the laser 1928 is started and continued until it comes to coincide with the next resonance frequency.

In the i-th optical transmitter/receiver, on the other hand, the optical signal sent from the network is introduced partly to the optical receiver 1902 and partly to the optical transmitter 1902. The optical detector 1904 of the optical transmitter 1902 detects the laser 1928 and the optical signal from a related laser 1909. Upon receipt of an intensity-modulated optical signal with frequency Fi from the optical frequency regulator, the optical detector 1904 detects the deviation (beat) signal 1911 and the laser 1909. The optical frequency of the laser 1909 is corrected by the temperature/current control circuit 1908 in such a manner that the beat signal 1911 becomes zero or a predetermined value. A bandpass filter 1905 of a pass bandwidth Fi is prepared in order to prevent the erroneous operation at an optical frequency setting signal for the transmitters of the other optical transmitter/receivers. A signal is outputted only when the beat signal 1911 contains a component of frequency Fi, and the temperature/current control circuit 1908 is operated only in that case. According to the embodiment shown in FIG. 19, the optical frequency intensity-modulated with frequency Fi sent from the network should be made to coincide with the optical frequency of the laser 1909. This embodiment facilitates the system initiation and permits automatic start.

Apart from FIG. 19 showing an embodiment in which the optical frequency regulator has only one laser, an optical signal of a regulated optical frequency can be transmitted to all the optical transmitter/receivers at the same time, if lasers as many as the optical transmitter/receivers are prepared.

Figure 20A:
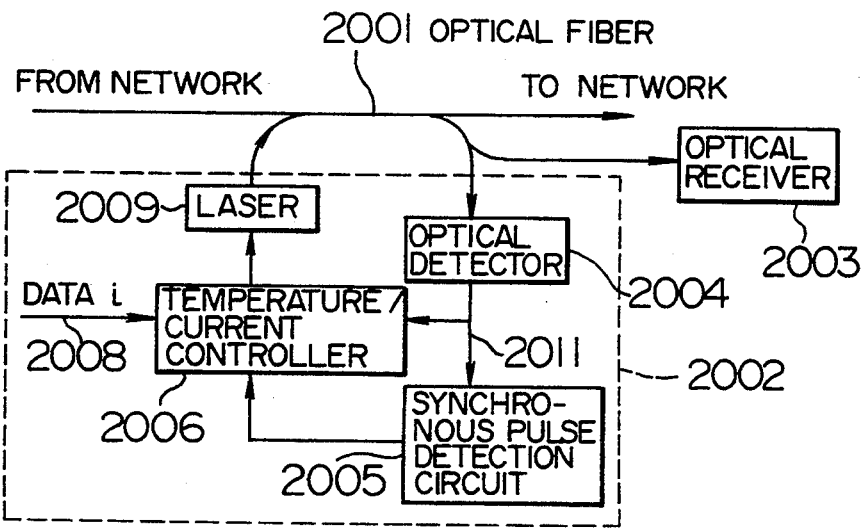
FIGS. 20A and 20B are a diagram showing a sixth embodiment of an optical frequency regulator and an optical transmitter/receiver of an optical frequency stabilization system shown in FIG. 14.
Figure 20B:
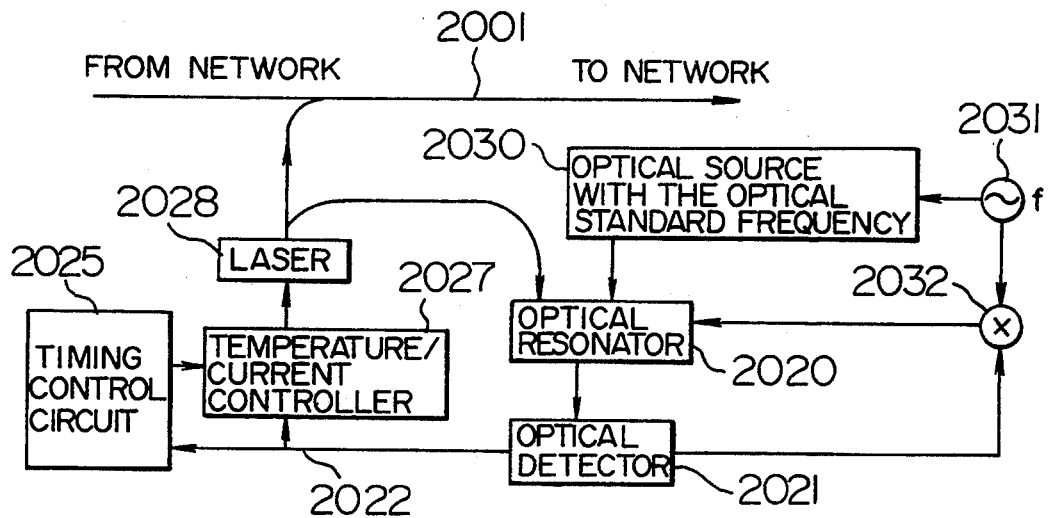

FIG. 20 is a diagram showing a configuration of each part of the optical frequency stabilization system shown in FIG. 14 according to a sixth embodiment. FIG. 20A shows a configuration of an optical transmitter/receiver, and FIG. 20B that of an optical frequency regulator. According to this embodiment, the intensity modulator 1929 and the signal 1927 of frequency Fi of the optical frequency regulator are eliminated from the configuration of the embodiment shown in FIG. 19, and the bandpass filter 1905 is replaced by a sync detector 2005 for detecting a sync signal 2011 in the optical transmitter/receiver. As in the case of FIG. 16, the optical frequency regulator is synchronized with each optical transmitter/receiver to send a regulated optical frequency to each optical transmitter/receiver, thus eliminating the intensity modulator from the optical frequency regulator. The optical fiber 2001, the optical transmitter 2002, the optical receiver 2003, the detector 2004, the temperature/current control circuit 2006, the data i signal 2008 and the laser 2009 of the optical transmitter/receiver correspond to the optical fiber 1901, the optical transmitter 1902, the optical receiver 1903, the detector 1904, the temperature/current control circuit 1906, the data i signal 1908 and the laser 1909, respectively. Also, the output signal 2022 of the detector 2021 of the optical frequency regulator, the timing control circuit 2025, the temperature/current control circuit 2027 and the laser 2028 correspond to the output signal 1922 of the detector 1921, the timing control circuit 1925, the temperature/current control circuit 1927 and the laser 1928 shown in FIG. 19, respectively. Further, the functions and configuration of the optical resonator 2020, the standard light 2030, the signal source 2031 and the mixer 2032 of the optical frequency regulator are similar to those of the optical resonator 1720, the standard light 1730, the signal source 1731 and the mixer 1732 shown in FIG. 17, respectively.

We claim:

1. An optical frequency division multiplexing transmission system comprising:
   an optical frequency division multiplexing transmitter equipment for multiplexing by frequency division and outputting a plurality of optical signals of different wavelengths and an optical frequency division multiplexing receiver equipment including a plurality of heterodyne optical receivers for receiving said optical signals, respectively;
   wherein said optical frequency division multiplexing transmitter equipment includes a first optical filter having a periodic optical transmission characteristic, with central frequencies on the frequency axis, first optical filter stabilization means for stabilizing the transmission characteristic of said first optical filter, and an optical signal frequency stabilization circuit for stabilizing the central frequencies of said optical signals, respectively, according to the transmission characteristic of said first optical filter; and
   said optical frequency division multiplexing receiver equipment includes a second optical filter having a periodic optical transmission characteristic, with central frequencies, on the frequency axis, second optical filter stabilization means for stabilizing the transmission characteristic of the second optical filter, and a local optical source frequency stabilization circuit for stabilizing the frequencies of local optical sources of the heterodyne optical receivers, respectively, in accordance with the transmission characteristic of the second optical filter;
   said system further comprising means for causing the difference between the stabilized central frequencies of the optical signals and the stabilized frequency of the local optical source corresponding to each optical signal to coincide with the optimum intermediate frequency for each heterodyne optical receiver.

2. An optical frequency division multiplexing transmission system according to claim 1, wherein a period of the transmission characteristic of said first optical filter is set to the interval of the central frequencies of said optical signals divided by a natural number.

3. An optical frequency division multiplexing transmission system according to claim 1, wherein a period of the transmission characteristic of the second optical filter is set to the interval of the central frequencies of said optical signals divided by a natural number.

4. An optical frequency division multiplexing transmission system according to claim 3, wherein said period of the transmission characteristic of the second optical filter is set to said intermediate frequency divided by a natural number.

5. An optical frequency division multiplexing transmission system according to claim 1, wherein said first optical filter stabilization means includes:
   a first optical source with an optical standard frequency for outputting an absolutely-stabilized optical standard frequency, an optical frequency modulator for frequency-modulating the light outputted from said optical source with a frequency $f_0$;
   an optical coupler for multiplexing the frequency-modulated light and said optical frequency division multiplexing signal and inputting a multiplexed signal to said first optical filter;

a photo-diode for converting the light outputted from said optical filter into an electrical signal and producing a detected signal;

a bandpass filter for extracting a signal component proximate to frequency $f_0$ from the detected signal;

an oscillator for outputting a sinusoidal wave signal of frequency $f_0$;

a multiplier for multiplying the [extracted]signal extracted from the bandpass filter with said sinusoidal wave signal;

a low-pass filter, with cut-off frequency of $f_{LPF} \ll f_0$, for extracting an error signal from the multiplied signal; and a temperature control circuit for controlling a temperature of the first optical filter based on the error signal.

6. An optical frequency division multiplexing transmission system according to claim 5, wherein said second optical filter stabilization means includes:

a second optical source with the optical standard frequency for outputting an absolutely-stabilized optical standard frequency;

an optical frequency modulator for frequency modulating the light outputted from the optical source with frequency $f_0$;

a star coupler for multiplexing said local optical signals;

an optical coupler for multiplexing the frequency-modulated light and the multiplexed local optical signals and inputting the resulting signal to the second optical filter;

a photo-diode for converting the light outputted from said filter into an electrical signal and producing a detected signal;

a bandpass filter for extracting a signal component of frequency $f_0$ from the detected signal;

an oscillator for outputting a sinusoidal wave signal of frequency $f_0$;

a multiplier for multiplying the signal extracted from the bandpass filter with said sinusoidal wave signal to produce a multiplied signal;

a low-pass filter, with a cut-off frequency of $f_{LPF} \ll f_0$, for extracting an error signal from the multiplied signal; and a temperature control circuit for controlling a temperature of the second optical falter based on the error signal;

and the optical frequency of said first optical source with the optical standard frequency is caused to coincide with the optical frequency of said second optical source with the optical standard frequency.

7. An optical frequency division multiplexing transmission system according to claim 6, wherein a period of the transmission characteristic of said first optical filter is set to the interval of the central frequencies of said optical signals divided by a natural number, a period of the transmission characteristic of said second optical filter is set to the interval of the central frequencies of said optical signals divided by a natural number, and the period of the transmission characteristic of the second optical filter is set to the intermediate frequency divided by a natural number.

8. An optical frequency division multiplexing transmission system according to claim 7, wherein the optical frequency of said first and second optical sources with the optical standard frequency, a frequency associated with selected one of maximum and minimum transmission characteristics of said first optical filter and a frequency associated with selected one of maximum and minimum transmission characteristics of said second optical filter, are caused to coincide with each other.

9. An optical frequency division multiplexing transmission system according to claim 7, wherein the central frequencies of the optical signals are stabilized to an optical frequency associated with selected one of maximum and minimum transmission characteristics of said first optical filter by said optical signal frequency stabilization circuit, and the frequencies of the local optical sources of the heterodyne optical receivers are stabilized to a frequency associated with selected one of maximum and minimum transmission characteristics of said second optical filter by the local optical source frequency stabilization circuit.

10. An optical frequency division multiplexing transmission system according to claim 7, wherein:

the optical frequency of said first and second optical sources with the optical standard frequency, a frequency associated with selected one of maximum and minimum transmission characteristics of said first optical filter and a frequency associated with selected one of maximum and minimum transmission characteristics of the second optical filter are caused to coincide with each other;

the central frequencies of the optical signals are stabilized to different optical frequencies respectively associated with selected one of maximum and minimum transmission characteristics of said first optical filter by said optical signal frequency stabilization circuit; and the frequencies of the local optical sources of said heterodyne optical receivers are stabilized to a frequency associated with selected one of maximum and minimum transmission characteristics of said second optical filter by said local optical source frequency stabilization circuit.

11. An optical frequency division multiplexing transmission system according to claim 5, wherein said optical signal frequency stabilization circuit includes a multiplier for multiplying an information signal applied to the optical frequency division multiplexing transmitter equipment with said detected signal to produce a multiplied signal, and a low-pass filter for extracting an error signal from the multiplied signal.

12. An optical frequency division multiplexing transmission system according to claim 1, wherein said second optical filter stabilization means includes:

a second optical source with an optical standard frequency for outputting an absolutely-stabilized optical standard frequency;

an optical frequency modulator for frequency modulating the light outputted from the second optical source with a frequency $f_0$;

a star coupler for multiplexing said local optical signals;

an optical coupler for multiplexing the frequency-modulated light and the multiplexed local optical signals and inputting a multiplexed signal to the second optical filter;

a photo-diode for convening the light outputted from said optical filter into an electrical signal and producing a detected signal;

a bandpass filter for extracting a signal component of frequency $f_0$ from the detected signal;

an oscillator for outputting a sinusoidal wave signal of frequency $f_0$;

a multiplier for multiplying the signal extracted from the band pass filter and the sinusoidal wave signal to produce a multiplied signal;

a low-pass filter, with a cut-off frequency of $f_{LPF} \ll f_0$, for extracting an error signal from the multiplied signal; and a temperature control circuit for controlling a temperature of the second optical filter based on the error signal.

13. An optical frequency division multiplexing transmission system according to claim 12, wherein said local optical source frequency stabilization circuit includes a bandpass filter for extracting the components of a frequency $f_1$ from said detected signal, an oscillator, with frequency $f_1$, for outputting a sinusoidal wave signal, a multiplier for multiplying the extracted signal with the sinusoidal wave signal, a lowpass filter, with a cut-off frequency $f_{LPF}$ $f_1$, for extracting an error signal from the multiplied signal, and an adder for adding the error signal and a bias signal for the sinusoidal wave signal to each other.

14. An optical frequency division multiplexing transmission system according to claim 13, wherein the frequencies of the oscillators in said local optical source frequency stabilization circuit of said heterodyne optical receiver are different from each other.

15. An optical frequency division multiplexing transmission system according to claim 1, wherein the first optical filter is a Fabry-Perot optical resonator and the second optical filter is a Fabry-Perot optical resonator.

16. An optical frequency division multiplexing transmission system according to claim 1, wherein the first optical filter is a Mach-Zehnder optical filter and the second optical filter is a Mach-Zehnder optical filter.

17. An optical frequency division multiplexing transmission system according to claim 1, wherein said heterodyne optical receiver includes a local optical source frequency stabilization circuit, a local optical source, an optical coupler for dividing a local optical signal from the local optical source, a polarization diversity optical receiver for receiving an optical signal from the optical coupler and outputting a base band signal based on one of the outputs of said optical coupler, and a decision and regeneration circuit for discriminating and regenerating an information signal based on the base band signal output from the polarization diversity optical receiver.

18. An optical frequency division multiplexing transmission system according to claim 17, wherein said polarization diversity optical receiver includes a polarization isolator for isolating an optical signal into horizontal and vertical polarization optical signals, an optical coupler for dividing said local optical signal into first and second local optical signals, a first balanced receiver for subjecting a horizontal polarization optical signal to heterodyne detection by use of the first local optical signal, a first demodulator circuit for converting a first intermediate frequency signal outputted from the first balanced receiver into a first base band signal, a second balanced receiver for subjecting a vertical polarization optical signal to heterodyne detection by use of a second local optical signal, a second demodulator circuit for converting a second intermediate frequency signal outputted from the second balanced receiver into a second base band signal, and an adder for adding the first and second base band signals to each other and outputting the base band signal.

19. An optical frequency division multiplexing transmission system according to claim 1, wherein the optical frequency division multiplexing transmitter equipment and the optical frequency division multiplexing receiver equipment are connected by an optical fiber.

20. An optical frequency division multiplexing transmission system according to claim 19, wherein an optical amplifier is connected to said optical fiber.

21. An optical frequency division multiplexing transmission system according to claim 1, wherein said first optical filter stabilization means includes:

a first optical source with the optical standard frequency for outputting light frequency modulated with frequency $f_0$ around an absolutely stabilized optical standard frequency;

an optical coupler for multiplexing the light outputted from said first optical source with said optical frequency division multiplexing signal and inputting the resulting signal to said first optical filter;

a photo-diode for converting the light outputted from said optical filter into an electrical signal and producing a detected signal;

a bandpass filter for extracting a signal component proximate to frequency $f_0$ frown the detected signal;

an oscillator for outputting a sinusoidal wave signal of frequency $f_0$;

a multiplier for multiplying the signal extracted from the bandpass filter and said sinusoidal wave signal with each other to produce a multiplied signal;

a low-pass filter, with a cut-off frequency $f_{LPF} \ll f_0$, for extracting an error signal from the multiplied signal; and a temperature control circuit for controlling a temperature of said first optical filter based on the error signal.

22. An optical frequency division multiplexing transmission system according to claim 1, wherein said second optical filter stabilization means includes:

a second optical source with the optical standard frequency for outputting light frequency modulated with a frequency $f_0$ around an absolutely stabilized optical standard frequency;

a star coupler for multiplexing the local optical signals;

an optical coupler for multiplexing the frequency-modulated light and said multiplexed local optical signals and inputting the resulting signal to said second optical filter;

a photo-diode for convening the light outputted from said optical filter into an electrical signal and producing a detected signal;

a bandpass filter for extracting a signal component of frequency $f_0$ from the detected signal;

an oscillator for outputting a sinusoidal wave signal of frequency $f_0$;

a multiplier for multiplying the signal extracted from the bandpass filter with said sinusoidal wave signal to produce a multiplied signal;

a low-pass filter, with a cut-off frequency $f_{LPF} \ll f_0$ for extracting an error signal from the multiplied signal; and a temperature control circuit for controlling a temperature of the second optical filter based on the error signal.

23. An optical frequency division multiplexing transmission system according to claim 1, comprising a plurality of optical frequency division multiplexing means.

24. An optical frequency division multiplexing transmission system according to claim 23, wherein a plurality of optical frequency division multiplexing transmission means are connected in the last half stage of the optical frequency division multiplexing transmission means, and a plurality of optical frequency division multiplexing transmission means are connected in the last half stage of the optical frequency division multiplexing transmission means.

25. An optical frequency division multiplexing transmission system according to claim 23, wherein the optical frequency division multiplexing transmitter equipment and the optical frequency division multiplexing receiver equipment other than the optical frequency division multiplexing transmitter equipment at the sending end and the optical frequency division multiplexing receiver equipment at the receiving end are replaced, in part or in whole, by optical amplifiers.

26. An optical frequency division multiplexing transmission system according to claim 1, wherein optical frequency division multiplexing means for transmitting a natural number m out of N channels is connected with optical frequency division multiplexing means for transmitting the remainder, N−m, of the N channels in the last half stage of the optical frequency division multiplexing transmission system for transmitting information signals of the number N of channels.

27. An optical frequency division multiplexing transmission system according to claim 1, wherein optical frequency division multiplexing transmission means capable of transmitting m+p channels at the same time is connected in the last half stage of said optical frequency division multiplexing means for transmitting m-channel, where m is a natural number, information signals and the optical frequency division multiplexing transmission means for transmitting p-channel, where p is a natural number, information signals.

28. An optical frequency division multiplexing transmission system according to claim 1, wherein at least one of the optical sources for generating a plurality of optical signals is arranged at a place different from said first optical filter stabilization means.

29. An optical frequency division multiplexing transmission system according to claim 28, wherein the information for stabilizing the central frequency of said optical source is transmitted from the first optical filter stabilization means to said optical source by use of an optical fiber.

30. An optical frequency division multiplexing transmission system comprising an optical frequency division multiplexing transmitter equipment for multiplexing by frequency division and outputting a plurality of optical signals having different wavelengths, and an optical frequency division multiplexing receiver equipment having a tunable heterodyne optical receiver for selectively receiving one of said optical signals, wherein said optical frequency division multiplexing transmitter equipment includes:

a first optical filter having a periodic optical transmission characteristic, with central frequencies, on the frequency axis, a first optical filter stabilization means for stabilizing the transmission characteristic of the first optical filter, and an optical signal frequency stabilization circuit for stabilizing the central frequencies of said optical signals on the basis of the transmission characteristic of the first optical filter;

said optical frequency division multiplexing receiver equipment includes a second optical filter having a periodic optical transmission characteristic on the frequency axis, a second optical filter stabilization means for stabilizing the transmission characteristic of the second optical filter, a local optical source frequency stabilization circuit for stabilizing the frequency of a tunable local optical source of the heterodyne optical receiver on the basis of the transmission characteristic of the second optical filter, and an optical tuner for tuning the frequency of said local optical source; and the difference between the stabilized central frequencies of said optical signals and the frequency of the local optical source at the time of receiving each optical signal is caused to coincide substantially with the optimum intermediate frequency for the heterodyne optical receiver.

31. An optical frequency division multiplexing transmission system according to claim 30, wherein said first optical filter stabilization means includes:

a first optical source with an optical standard frequency for outputting an absolutely stabilized optical standard frequency;

an optical frequency modulator for frequency modulating the light outputted from said optical source with frequency $f_0$;

an optical coupler for multiplexing a frequency-modulated light and said optical frequency division multiplexing signal with each other and inputting the resulting signal to said first optical filter;

a photo-diode for converting the light outputted from said optical filter into an electrical signal and producing a detected signal;

a bandpass filter for extracting a signal component proximate to frequency $f_0$ from the detected signal;

an oscillator for outputting a sinusoidal wave signal of frequency $f_0$;

a multiplier for multiplying said signal extracted from said bandpass filter with said sinusoidal wave signal to produce a multiplied signal;

a low-pass filter, with a cut-off frequency $f_{LPF} \ll f_0$, for extracting an error signal from the multiplied signal; and a temperature control circuit for controlling a temperature of said first optical filter based on the error signal.

32. An optical frequency division multiplexing transmission system according to claim 31, wherein:

said second optical filter stabilization means includes a second optical source with an optical standard frequency for outputting an absolutely stabilized optical standard frequency, an optical frequency modulator for frequency-modulating the light outputted from an optical source with frequency $f_0$, an optical coupler for multiplexing a frequency-modulated light with said local optical signal and inputting the resulting signal to said second optical filter, a photo-diode for converting the light outputted from said optical filter into an electrical signal and producing a detected signal, a bandpass filter for extracting a signal component of frequency $f_0$ from the detected signal, an oscillator for outputting a sinusoidal wave signal of frequency $f_0$, a multiplier for multiplying the signal extracted from the bandpass filter with the sinusoidal wave signal to produce a multiplied signal, a lowpass filter, with a cut-off frequency $f_{LPF}$ $f_0$, for extracting an error signal from the multiplied signal, and a temperature control circuit for controlling a temperature of the second optical filter based on the error signal; and the optical frequency of said first optical source with the optical standard frequency is caused to coincide with that of said second optical source with the optical standard frequency, a period of the transmission characteristic of said first optical filter is set to the interval of the central frequencies of said optical signals divided by a natural number, a period of the transmission characteristic of said second optical filter is set to the interval of the central frequencies of said optical signals divided by a natural number, and the period of the transmission characteristic of the second optical filter is set to an intermediate frequency divided by a natural number.

33. An optical frequency division multiplexing transmission system according to claim 32, wherein:

the optical frequency of said first and second optical sources with the optical standard frequency, a frequency associated with selected one of maximum and minimum transmission characteristics of said first optical filter, and the frequency associated with selected one of maximum and minimum transmission characteristics of said second optical filter are caused to coincide with each other;

the central frequencies of said optical signals are stabilized to an optical frequency associated with selected one of maximum and minimum transmission characteristic of said first optical filter by said optical signal frequency stabilization circuit; and the frequency of the local optical source of said heterodyne optical receiver is set to a frequency associated with selected one of maximum and minimum transmission characteristics of said second optical filter by said local optical source frequency stabilization circuit.

34. An optical frequency division multiplexing transmission system according to claim 30, wherein said second optical filter stabilization means includes:

a second optical source with the optical standard frequency for outputting an absolutely stabilized optical standard frequency;

an optical frequency modulator for frequency modulating the light outputted from an optical source with frequency $f_0$;

an optical coupler for multiplexing a frequency-modulated light and said local optical signal with each other and inputting the resulting signal to said second optical filter;

a photo-diode for converting the light outputted from said optical filter into an electrical signal and producing a detected signal;

a bandpass filter for extracting a signal component of frequency $f_0$ from the detected signal;

an oscillator for outputting a sinusoidal wave signal of frequency $f_0$;

a multiplier for multiplying the signal extracted from the bandpass filter with said sinusoidal wave signal to produce a multiplied signal;

a low-pass filter, with a cut-off frequency $f_{LPF} \ll f_0$, for extracting an error signal frown the multiplied signal; and a temperature control circuit for controlling a temperature of the second optical filter based on the error signal.

35. An optical frequency division multiplexing transmission system according to claim 34, wherein said local optical source frequency stabilization circuit includes a bandpass filter for extracting a component of frequency $f_1$ from said detected signal, an oscillator, with frequency $f_1$, for outputting a sinusoidal wave signal, a multiplier for multiplying an extracted signal with a sinusoidal wave signal to produce a multiplied signal, a low-pass filter, with a cut-off frequency $f_{LPF} \ll f_1$, for extracting an error signal from the multiplied signal, and an adder for adding the error signal and the sinusoidal wave signal bias to each other.

36. An optical frequency division multiplexing transmission system according to claim 30, wherein said heterodyne optical receiver includes a local optical source frequency stabilization circuit, a tunable local optical source, an optical coupler for dividing a local optical signal, a polarization diversity optical receiver for receiving an optical signal and outputting a base band signal by use of one of the outputs of said optical coupler, and a decision and regeneration circuit for discriminating and regenerating an information signal from the signal outputted from the polarization diversity optical receiver.

37. An optical frequency division multiplexing transmission system according to claim 30, wherein said local optical source frequency stabilization circuit has built therein means for switching the local optical source frequency stabilization circuit to and from the tunable local optical source.

38. An optical frequency division multiplexing transmission system according to claim 37, wherein said optical tuner includes a low-pass filter for removing a signal component of frequency $f_1$, a pulse counter for counting pulses generated as a detected signal at the time of switching the local frequencies, a comparator for comparing the number of the counted pulses with a number of pulses to be generated at the time of switching channels, and a controller for controlling said switching means and the frequency of said tunable local optical source in accordance with the output of said comparator.

39. An optical frequency division multiplexing transmission system according to claim 38, wherein said heterodyne optical receiver includes a local optical source frequency stabilization circuit, an optical tuner, a tunable local optical source, an optical coupler for dividing a local optical signal, a polarization diversity optical receiver for receiving an optical signal and outputting a base band signal by use of one of the outputs of said optical coupler, and a decision and regeneration circuit for discriminating and regenerating an information signal from the signal outputted from the polarization diversity optical receiver.

40. An optical frequency division multiplexing transmission system according to claim 30, wherein said optical frequency division multiplexing transmitter equipment and said optical frequency division multiplexing receiver equipment are connected to each other by an optical fiber.

41. An optical frequency division multiplexing transmission system according to claim 40, wherein an optical amplifier is connected to said optical fiber.

42. An optical frequency division multiplexing transmission system according to claim 30, wherein a plurality of optical frequency division multiplexing transmission means described in claim 30 are connected in the last half stage of the optical frequency division multiplexing transmission system.

43. An optical frequency division multiplexing receiver equipment comprising:
an optical demultiplexer for isolating optical signals of a number N of channels multiplexed by frequency division;
a number N of heterodyne optical receivers for receiving the isolated optical signals and regenerating an information signal respectively;
an optical multiplexer for multiplexing local optical signals outputted from local optical sources of said heterodyne optical receivers;
an optical filter inputted with said multiplexed light and having a periodic optical transmission characteristic on the frequency axis;
optical filter stabilization means for stabilizing the transmission characteristic of the optical filter; and
a number N of local optical source frequency stabilization circuits for stabilizing the frequencies of the local optical sources respectively on the basis of the transmission characteristic of the optical filter.

44. An optical frequency division multiplexing receiver equipment comprising:
a heterodyne optical receiver for selectively receiving one channel from a number N of channels of optical signals multiplexed by frequency division;
an optical coupler for dividing the local optical source signal outputted from a tunable local optical source of the heterodyne optical receiver into two parts;
an optical filter inputted with one of the divided optical signals and having a periodic optical transmission characteristic on the frequency axis;
optical filter stabilization means for stabilizing the transmission characteristic of the optical filter;
a local optical source frequency stabilization circuit for stabilizing the frequency of the local optical source on the basis of the transmission characteristic of the optical filter; and
an optical tuner for tuning the frequency of the local optical source.

45. An optical frequency division multiplexing transmitter equipment comprising:
a number N of optical sources for converting information signals of a number N of channels into optical signals respectively;
an optical filter for optically multiplexing the optical signals of N channels and outputting an optical frequency division multiplexing signal, said optical filter having a periodic optical transmission characteristic on the frequency axis;
an optical coupler for dividing the optical frequency division multiplexing signal into two parts;
optical filter stabilization means for stabilizing the transmission characteristic of the optical filter; and
a number N of optical signal frequency stabilization circuits for stabilizing the central frequencies of said N-channel optical signals on the basis of the transmission characteristic of the optical filter.

46. An optical frequency division multiplexing receiver equipment comprising:
an optical demultiplexer for isolating a plurality of optical signals of N channels multiplexed by frequency division;
a number N of heterodyne optical receivers for receiving the divided optical signals and regenerating information signals;
an optical filter for multiplexing the local optical signals outputted from local optical sources of said heterodyne optical receivers respectively, and having a periodic optical transmission characteristic on the frequency axis;
optical filter stabilization means for stabilizing the transmission characteristic of the optical filter; and
a number N of local optical source frequency stabilization circuits for stabilizing the frequencies of the local optical sources respectively on the basis of the transmission characteristic of the optical filter.

47. An optical frequency stabilization system comprising:
a plurality of optical sources for generating light of specific optical frequencies respectively;
an optical frequency regulator for regulating the optical frequencies of said optical sources;
optical input means including a transmission path for connecting the optical sources and the optical frequency regulator to each other for enabling the optical frequency regulator to receive a part of the optical signals from said optical sources;
means for determining a deviation between the regulated optical frequency defined in said optical frequency regulator and the frequency of said optical signals; and
optical output means for sending out said deviation to said optical sources through said transmission path;
each of said optical sources including means for correcting the optical frequencies of the respective optical sources in such a manner as to maintain said deviation at selected one of zero and a predetermined value.

48. An optical frequency stabilization system according to claim 47, wherein said transmission path is one for optical transmission.

49. An optical frequency stabilization system comprising:
a plurality of optical sources for generating light of specific optical frequencies respectively;
an optical frequency regulator for regulating the optical frequencies of said optical sources; and
optical output means including an optical transmission path for connecting said optical sources and said optical frequency regulator to each other for enabling said optical frequency regulator to send out optical signals of regulated optical frequencies defined in said regulator;
each of said optical sources including detector means for detecting the deviation between the optical frequencies thereof and said regulated optical frequency and correcting means for correcting the optical frequencies of said optical sources respectively in such a manner as to maintain said deviation at selected one of zero and a predetermined value.

50. An optical frequency stabilization system according to claim 49, wherein said optical sources are for a plurality of optical transmitter/receivers of an optical communications system for transmitting information by optical frequency multiplexing using an optical signal.

51. An optical frequency stabilization system according to claim 50, wherein the wavelength band of said optical signal used for transmitting said deviation value and that of an optical signal for transmitting the information transmitted/received by said optical transmitter/receivers are different from each other.

52. An optical frequency stabilization system according to claim 49, wherein said optical frequency regulator includes an optical resonator having a periodic transmission characteristic on the optical frequency axis and optical frequency control means having an optical frequency associated with selected one of maximum and minimum intensities of selected one of transmitted and reflected light of said optical resonator as a regulated optical frequency.

53. An optical frequency stabilization system according to claim 52, wherein:
said optical transmitter/receiver includes first frequency modulator means for frequency-modulating the light of said optical sources with different frequencies respectively; and
said means for determining the deviation of said optical frequency regulator includes means for applying a part of the optical signals modulated by said first frequency modulator means to said optical frequency control means, a detector for detecting selected one of transmitted and reflected lights from said optical frequency control means and converting said light into an electrical signal, and synchronous detection means for synchronously detecting the output of said detector in time division by the signals of different frequencies.

54. An optical frequency stabilization system according to claim 53, wherein said optical frequency regulator includes means for sending out an optical signal containing said deviations in time division, and each of said optical transmitter/receivers includes means for securing synchronization with said optical frequency regulator and isolating a signal to be received thereby.

55. An optical frequency stabilization system according to claim 53, wherein said optical frequency regulator includes means for sending out an optical signal containing said deviations as selected one of frequency- and intensity-modulated signals, and each of said optical transmitter/receivers includes means for isolating only a signal subjected to selected one of frequency and intensity-modulations with a frequency specific thereto from selected one of the frequency- and intensity-modulated signals, respectively.

56. An optical frequency stabilization system according to claim 53, wherein said optical frequency regulator includes means for sending out optical signals containing a plurality of deviations by adding thereto a header specific to the optical transmitter/receivers respectively, and each of said optical transmitter/receivers includes means for receiving only said signals with a header specific to respective optical transmitter/receivers.

57. An optical frequency stabilization system according to claim 53, wherein said optical frequency regulator includes means for sending out by changing the wavelengths of the optical signals containing a plurality of deviations, and each of said optical transmitter/receivers includes means for isolating only a signal of a wavelength specific to said respective optical transmitter/receivers from said optical signals.

58. An optical frequency stabilization system according to claim 52, wherein:
said optical transmitter/receivers include first frequency modulator means for frequency-modulating the light of said optical sources with the same frequency respectively; and
said means for determining the deviation of said optical frequency regulator includes means for applying a part of the optical signals modulated by said frequency modulator means to said optical frequency control means, a detector for detecting selected one of transmitted and reflected light from said optical frequency control means and converting said light into an electrical signal, and synchronous detection means for synchronously detecting the output of said detector in time division with said signals of the same frequency.

59. An optical frequency stabilization system according to claim 52, wherein said optical resonator of said optical frequency regulator includes means connected to a standard optical source with an optical fiber for controlling selected one of maximum and minimum values of said optical resonator with the frequencies of the optical signals outputted from said standard optical source.

60. An optical frequency stabilization system according to claim 49, wherein:
said optical frequency regulator and said optical transmitter/receivers include synchronizing means,
said sending means of said optical frequency regulator is configured in such a manner as to transmit said optical signals in time division, and
said synchronizing means of said optical transmitter/receivers is configured in such a manner that only one of the optical transmitter/receivers receives the optical signals of the regulated optical frequency at a time.

61. An optical frequency stabilization system according to claim 49, wherein said sending means of said optical frequency regulator is configured in such a manner as to transmit the optical signals of said regulated optical frequency by intensity-modulation with a frequency specific to each of said optical transmitter/receivers, and said optical transmitter/receivers include means for receiving only the optical signals intensity-modulated with a frequency specific to said optical transmitter/receivers, respectively.

* * * * *

UNITED STATES PATENT AND TRADEMARK OFFICE
CERTIFICATE OF CORRECTION

PATENT NO. : 5,408,349            Page 1 of 2
DATED : April 18, 1995
INVENTOR(S) : Hideaki Tsushima, et al It is certified that error appears in the above-indentified patent and that said Letters Patent is hereby corrected as shown below:

| Column | Line | |
|---|---|---|
| 5 | 48 | Change "degree" to --degrees--. |
| 17 | 7 | Change "117A" to --17A--. |
| 21 | 10 | Change "the [extracted]signal" to --the signal--. |
| 21 | 48 | Change "falter" to --filter--. |
| 22 | 64 | Change "convening" to --converting--. |
| 23 | 20 | Change "$f_{LPF} \quad f_1,$" to --$f_{LPF} \ll f_1,$--. |
| 24 | 24 | Change "frown" to --from--. |
| 24 | 50 | Change "convening" to --converting--. |
| 24 | 60 | After "...$f_o$" insert --,--. |

UNITED STATES PATENT AND TRADEMARK OFFICE
CERTIFICATE OF CORRECTION

PATENT NO. : 5,408,349
DATED : April 18, 1995
INVENTOR(S) : Hideaki Tsushima, et al It is certified that error appears in the above-indentified patent and that said Letters Patent is hereby corrected as shown below:

| Column | Line | |
|---|---|---|
| 25 | 36 | After "p-channel" insert --information signals--. |
| 25 | 37 | After "number" delete ", information signals". |

Signed and Sealed this

Twenty-first Day of November, 1995

Attest:

BRUCE LEHMAN

*Attesting Officer*  *Commissioner of Patents and Trademarks*